(12) United States Patent
Inagaki

(10) Patent No.: US 10,341,822 B2
(45) Date of Patent: Jul. 2, 2019

(54) BROADCAST DELIVERY SYSTEM, GATEWAY DEVICE, BROADCAST DELIVERY METHOD AND STORAGE MEDIUM

(71) Applicant: NEC Corporation, Tokyo (JP)

(72) Inventor: Masashi Inagaki, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/562,274

(22) PCT Filed: Mar. 29, 2016

(86) PCT No.: PCT/JP2016/001805
§ 371 (c)(1),
(2) Date: Sep. 27, 2017

(87) PCT Pub. No.: WO2016/157890
PCT Pub. Date: Oct. 6, 2016

(65) Prior Publication Data
US 2018/0091955 A1 Mar. 29, 2018

(30) Foreign Application Priority Data
Mar. 30, 2015 (JP) .................................. 2015-068505

(51) Int. Cl.
*H04W 4/00* (2018.01)
*H04W 4/06* (2009.01)
(Continued)

(52) U.S. Cl.
CPC .............. *H04W 4/06* (2013.01); *H04W 4/02* (2013.01); *H04W 24/04* (2013.01); *H04W 60/00* (2013.01);
(Continued)

(58) Field of Classification Search
None
See application file for complete search history.

(56) References Cited

U.S. PATENT DOCUMENTS

2009/0265543 A1* 10/2009 Khetawat .............. H04L 63/104
713/151
2011/0244870 A1 10/2011 Lee
2015/0223191 A1* 8/2015 Lopes ................... H04W 64/00
455/456.1

FOREIGN PATENT DOCUMENTS

EP           2 846 590 B1    4/2017
JP          2014-175720 A    9/2014
(Continued)

OTHER PUBLICATIONS

Extended European Search Report dated Jul. 24, 2018 issued by the European Patent Office in counterpart application No. 16771777.6.
(Continued)

*Primary Examiner* — Zewdu A Beyen
(74) *Attorney, Agent, or Firm* — Sughrue Mion, PLLC

(57) ABSTRACT

A broadcast delivery system designed for the purpose of providing a broadcast delivery system that reduces the load on a wireless network control device comprises: a femto cell base station that provides a wireless connection to a terminal and forms one cell; a gateway device that relays data which the femto cell base station transmits to and receives from a core network; a wireless network control device that is connected to the gateway device; and a broadcast delivery device that transmits, to the wireless network control device, a broadcast delivery message addressed to the terminal connected to the femto cell base station. The gateway device controls the operating state of the femto cell base station and broadcast delivery to the terminal using, as a unit, a service area comprising one or more cells formed by the femto cell base station.

11 Claims, 23 Drawing Sheets

(51) Int. Cl.
  H04W 24/04    (2009.01)
  H04W 84/10    (2009.01)
  H04W 88/12    (2009.01)
  H04W 4/02     (2018.01)
  H04W 60/00    (2009.01)
  H04W 88/16    (2009.01)

(52) U.S. Cl.
  CPC .......... *H04W 84/10* (2013.01); *H04W 88/12* (2013.01); *H04W 88/16* (2013.01)

(56) References Cited

FOREIGN PATENT DOCUMENTS

| WO | 2010/119728 A1 | 10/2010 |
|---|---|---|
| WO | 2011/089819 A1 | 7/2011 |
| WO | 2011/127224 A1 | 10/2011 |

OTHER PUBLICATIONS

Communication dated Aug. 21, 2018 issued by the Japanese Patent Office in counterpart application No. 2017-509292.

"3rd Generation Partnership Project; Technical Specification Group Core Network and Terminals; Technical realization of Cell Broadcast Service (CBS) (Release 9)", 3GPP TS 23.041 V9.11.0, Dec. 2012, pp. 1-53.

"3rd Generation Partnership Project; Technical Specification Group Radio Access Network; UTRAN Iu-BC interface: Service Area Broadcast Protocol (SABP) (Release 10)", 3GPP TS 25.419 V10.2.0, Sep. 2011; pp. 1-78.

"3rd Generation Partnership Project; Technical Specification Group Radio Access Network; Universal Terrestrial Radio Access (E-UTRA); Study on Home Node B (HNB) emergency warning area (Release 12)" [online], 3GPP TR 25.703, V12.0.0, Mar. 17, 2014, [retrieved on Jun. 2, 2016]; Retrieved from the Internet: <URL: http://www.3gpp.org/ftp/Specs/archive/25_series/25.703/25703-c00.zip>.

3rd Generation Partnership Project; Technical Specification Group Radio Access Network; UTRAN architecture for 3G Home Node B (HNB); Stage 2 (Release 12) [online], 3GPP TS 25.467, V12.3.0, Dec. 26, 2014, [retrieved on Jun. 2, 2016], Retrieved from the Internet: <URL: http://www.3gpp.org/ftp/Specs/archive/25_series/25.457/25467-c30.zip, 91 pages.

3rd Generation Partnership Project; Technical Specification Group Core Network and Terminals; Restoration procedures (Release 13) [online], 3GPP TS 23,007, V13,0.0, Mar. 19, 2015, [retrieved on Jun. 2, 2016], Retrieved from the Internet: <URL: http://www.3gpp.org/ftp/Specs/archive/23_series/23.007/23007-d00.zip, 93 pages.

NEC, NTT DOCOMO, Introducing ETWS in Home (e) Node B, RAN Working Group 3 meeting #63bis R3(09)0915, Mar. 18, 2009, [retrieved on Jun. 2, 2016], Retrieved from the Internet: <URL: http://www.3gpp.org/ftp/tsg_ran/WG3_Iu/TSGR3_63bis/docs/R3-090915.zip>, 5 pages.

International Search Report of PCT/JP2016/001805 dated Jun. 14, 2016 [PCT/ISA/210].

Written Opinion of PCT/JP2016/001805 dated Jun. 14, 2016 [PCT/ISA/237].

\* cited by examiner

Fig. 4

HNB MANAGEMENT TABLE

| LAC | Service Are for Broadcast | HNB STATE | SA STATE |
|---|---|---|---|
| 100 | SA1 | OPERATING (ENABLED) | COMPLETE (ENABLED) |
| 101 | SA1 | OPERATING (ENABLED) | |
| 102 | SA1 | STOPPED (DISABLED) | |
| 200 | SA2 | STOPPED (DISABLED) | FAILURE (DISABLED) |
| 201 | SA2 | STOPPED (DISABLED) | |
| ... | ... | ... | |

Fig. 8

BROADCAST DELIVERY MANAGEMENT TABLE

| Service Area | BROADCAST DELIVERY STATE |
|---|---|
| SA1 | COMPLETE |
| SA2 | FAILURE |
| SA3 | COMPLETE |
| ... | ... |

BROADCAST DELIVERY SYSTEM, GATEWAY DEVICE, BROADCAST DELIVERY METHOD AND STORAGE MEDIUM

CROSS REFERENCE TO RELATED APPLICATIONS

This application is a National Stage of International Application No. PCT/JP2016/001805, filed Mar. 29, 2016, claiming priority based on Japanese Patent Application No. 2015-068505, filed Mar. 30, 2015, the contents of all of which are incorporated herein by reference in their entirety.

TECHNICAL FIELD

This disclosure relates to a broadcast delivery system, a gateway device, a broadcast delivery method, and a storage medium. It relates in particular to a broadcast delivery system, a gateway device, a broadcast delivery method, and a storage medium in the femto system.

BACKGROUND ART

PTL 1 discloses cell broadcast service (CBS) in a 3G (Third Generation mobile communication) network. The CBS is a system, for example, that delivers a broadcast message (a CBS message) to all terminals (UE: User Equipment) existing in a particular area, such as a region where a seismic intensity is expected to be a predetermined value or more when an earthquake occurs.

As explained in PTL 1, a CBC (Cell Broadcast Center) that delivers a CBS message manages an area by a cell ID of each RNC (Radio Network Controller) in an existing 3G network. Therefore, when the CBC obtains an instruction to deliver a CBS message from a CBE (Cell Broadcast Entity) server of the Meteorological Agency or the like, the CBS message is delivered to an RNC by the cell ID appropriate to a delivery target area. Each RNC receiving such message delivers a CBS message to a UE under a BTS (Base Transceiver Station) and replies to the CBC that the delivery is successful. As above, the broadcast CBS message is delivered to each UE in the existing 3G network.

Also, a base station for a femto cell covering an extremely narrow range with a radius of about several tens of meters has been recently installed. The femto cell base station is mainly installed at home or at an office and covers an indoor communication area.

NPL 1 discloses a network configuration of the CBS, operation of each device with which the CBS is configured, and the like. NPL 2 specifies a protocol between a CBC and an RNC (HNB-GW: Home Node B-GateWay), that is a SABP (Service Area Broadcast Protocol). It is noted that a CBS message delivered from the CBC as urgent news is transmitted to a service area (SA) and one SA is defined as one cell according to NPL 2.

CITATION LIST

Patent Literature

[PTL 1] WO2011/089819

Non Patent Literature

[NPL 1] 3GPP TS 23.041 V9.11.0 (2013-01) 3rd Generation Partnership Project; Technical realization of Cell Broadcast Service (CBS) (Release 9)

[NPL 2] 3GPP TS 25.419 V10.2.0 (2012-04) 3rd Generation Partnership Project; UTRAN Iu-BC interface: Service Area Broadcast Protocol (SABP) (Release 10)

SUMMARY OF INVENTION

Technical Problem

It is noted that each disclosure of above technical literatures in Citation List is incorporated by reference herein. The following analysis is carried out by the inventor of the present invention.

It is contemplated that the number of cells residing in an existing 3G system is around a few thousand. On the other hand, tens to hundreds of thousands of cells could be installed in the femto system. In addition, a cell in a 3G network is configured per NodeB and the main entity that controls this NodeB is a telecommunications carrier (a carrier). Thus, the NodeB is controlled and managed (for example, power on/off, a response to malfunction, and connection with an RNC of an upper node) by the carrier.

On the other hand, a cell in the femto system is configured per HNB (Home Node B). As mentioned above, the HNB is often installed in each home, at an office (on a floor in a company), in commercial facilities (for example, a shopping mall). Therefore, the HNB is controlled and managed (for example, power on/off, insertion and removal of a communication cable, or the like) not only by the carrier but also a general user who installs the HNB.

The following considers performing CBS in the femto system. In this case, a CBC manages an HNB state and a CBS message delivery state for delivering the CBS message to a cell. Specifically, the CBC manages the HNB's states of enabled (RESTART), disabled (FAILURE), and restart (RESET). The CBC also manages message delivery states to the HNB of delivery (WRITE-REPLACE), delivery stop (KILL), delivery status check (MESSAGE STATUS QUERY), and radio status check (LOAD QUERY).

Because there are overwhelmingly many cells and the HNB can be controlled and managed by a user in the femto system as mentioned above, the following problem could occur.

The amount of data exchanged between the CBC and HNBs increases because information transfer (signal transmission and reception) between the CBC and an HNB is required whenever a user changes the HNB's state and the number of delivery destinations of an urgent news message has increased. As a result, a problem, such as network congestion or a lack of a message, possibly occurs. Particularly, the HNB state management at a CBC bears heavy loads (especially, signaling loads) under an environment where the number of cells is enormous and a user can change the HNB's state, such as in the femto system, because it is specified that one cell is one SA (service area) according to NPL 2.

An objective of an exemplary example embodiment is to provide a broadcast delivery system, a gateway device, a broadcast delivery method, and a storage medium that contribute to reduction in loads of a wireless network control device (for example, a CBC (Cell Broadcast Center)).

Solution to Problem

A broadcast delivery system according to an exemplary example embodiment comprises: a femto cell base station for providing wireless connection for a terminal and forming one cell; a gateway device for relaying data that the femto cell base station transmits and receives with a core network; a wireless network control device connected to the gateway device; and a broadcast delivery device for transmitting, to the wireless network control device, a broadcast delivery message addressed to the terminal connected to the femto cell base station. The gateway device controls an operating state of the femto cell base station and broadcast delivery to the terminal using a service area comprising at least one or more cells formed by the femto cell base station as a unit.

A gateway device according to an exemplary example embodiment: relays data that a femto cell base station for providing wireless connection for a terminal and forming one cell transmits and receives with a core network; and controls an operating state of the femto cell base station and broadcast delivery to the terminal using a service area comprising at least one or more cells formed by the femto cell base station as a unit.

A broadcast delivery system according to a broadcast delivery method in an exemplary example embodiment, comprises: a femto cell base station for providing wireless connection for a terminal and forming one cell; a gateway device for relaying data that the femto cell base station transmits and receives with a core network; a wireless network control device connected to the gateway device; and a broadcast delivery device for transmitting, to the wireless network control device, a broadcast delivery message addressed to the terminal connected to the femto cell base station. The broadcast delivery method comprises the steps of: managing an operating state of the femto cell base station using a service area comprising at least one or more cells formed by the femto cell base station as a unit; and controlling broadcast delivery to the terminal using a service area comprising at least one or more cells formed by the femto cell base station as a unit.

According to a forth perspective of an exemplary example embodiment, a storage medium stores a program executed by a computer mounted on a gateway device for relaying data that a femto cell base station for providing wireless connection for a terminal and forming one cell transmits and receives with a core network. The program for executing: a process of managing an operating state of the femto cell base station using a service area comprising at least one or more cells formed by the femto cell base station as a unit; and a process of controlling broadcast delivery to the terminal using a service area comprising at least one or more cells formed by the femto cell base station as a unit is stored. It is noted that this program can be stored in a computer-readable storage medium. The storage medium can be non-transient, such as semiconductor memory, a hard disk, a magnetic recording medium, or an optical recording medium. An exemplary example embodiment can be embodied as a computer program product.

Advantageous Effects of Invention

According to an exemplary example embodiment, a broadcast delivery system, a gateway device, a broadcast delivery method, and a storage medium that contribute to reduction in loads of a wireless network control device are provided.

BRIEF DESCRIPTION OF DRAWINGS

FIG. 4 is a diagram showing one example of an HNB management table.

FIG. 8 is a diagram showing one example of a broadcast delivery management table.

EXAMPLE EMBODIMENT

Figure 1:
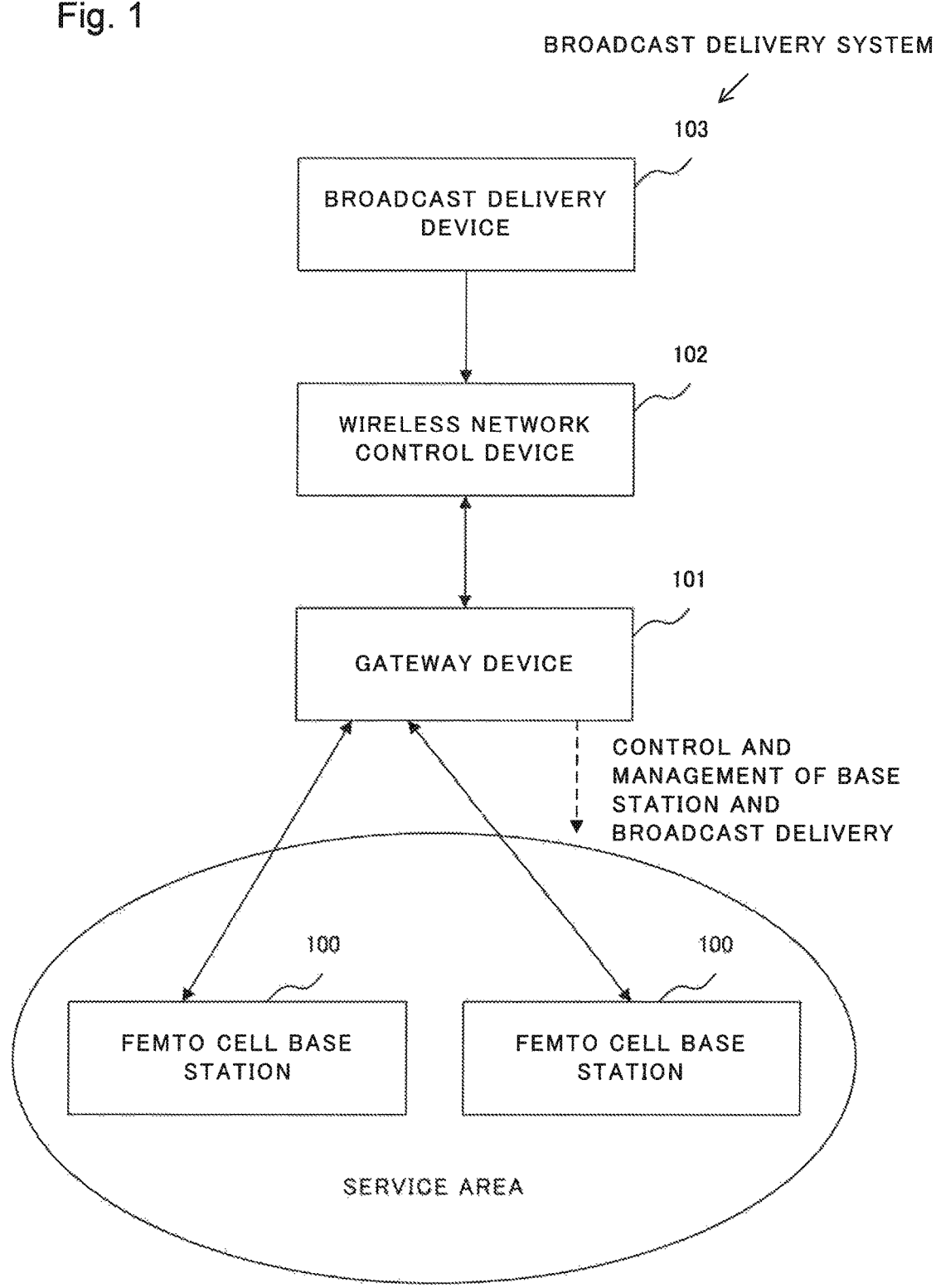
FIG. 1 is a diagram explaining an overview of one example embodiment.

Firstly, an overview of one exemplary example embodiment is explained. It is noted that reference numerals in the diagrams, which are quoted in this summary, are quoted with each element for simplicity as one example to help understanding and the description in this summary is not intended to limit anything.

A broadcast delivery system relating to one example embodiment includes a femto cell base station 100 for providing wireless connection for a terminal and forming one cell, a gateway device 101 for relaying data that the femto cell base station 100 transmits and receives with a core network, a wireless network control device 102 connected to the gateway device 101, and a broadcast delivery device 103 for transmitting, to the wireless network control device 102, a broadcast delivery message (an urgent news message) addressed to the terminal connected to the femto cell base station 100 (refer to FIG. 1). The gateway device 101 controls an operating state of the femto cell base station 100 and broadcast delivery to the terminal using a service area comprising at least one or more cells formed by the femto cell base station 100 as a unit.

The broadcast delivery system shown in FIG. 1 can deliver an urgent news message to terminals under a plurality of base stations (femto cell base stations) installed in a service area when the femto cell system is configured. In the broadcast delivery system described above, the gateway device (for example, HNB-GW) 101 manages a state of the femto cell base station 100 and controls the broadcast delivery instead of the wireless network control device (for example, a CBC) 102. In other words, the wireless network control device 102 is freed from the state management of all femto cell base stations, only has to manage a state per service area, and can deliver an urgent news message to terminals included in the service area. As a result, the number of signals between the wireless network control device 102 and the gateway device 101 decreases and loads of the wireless network control device 102 can be reduced. It means broadcast delivery service as has been realized in a 3G network can be provided without bearing excessive loads on an already-installed CBC when cell broadcast service (CBS) is introduced into the femto cell system.

A specific example embodiment is explained in further detail with reference to the drawings as follows. It is noted that the same numerals are assigned to the same components in each example embodiment and their explanations are omitted.

First Example Embodiment

The first example embodiment is explained in more detail using the drawings.

Figure 2:
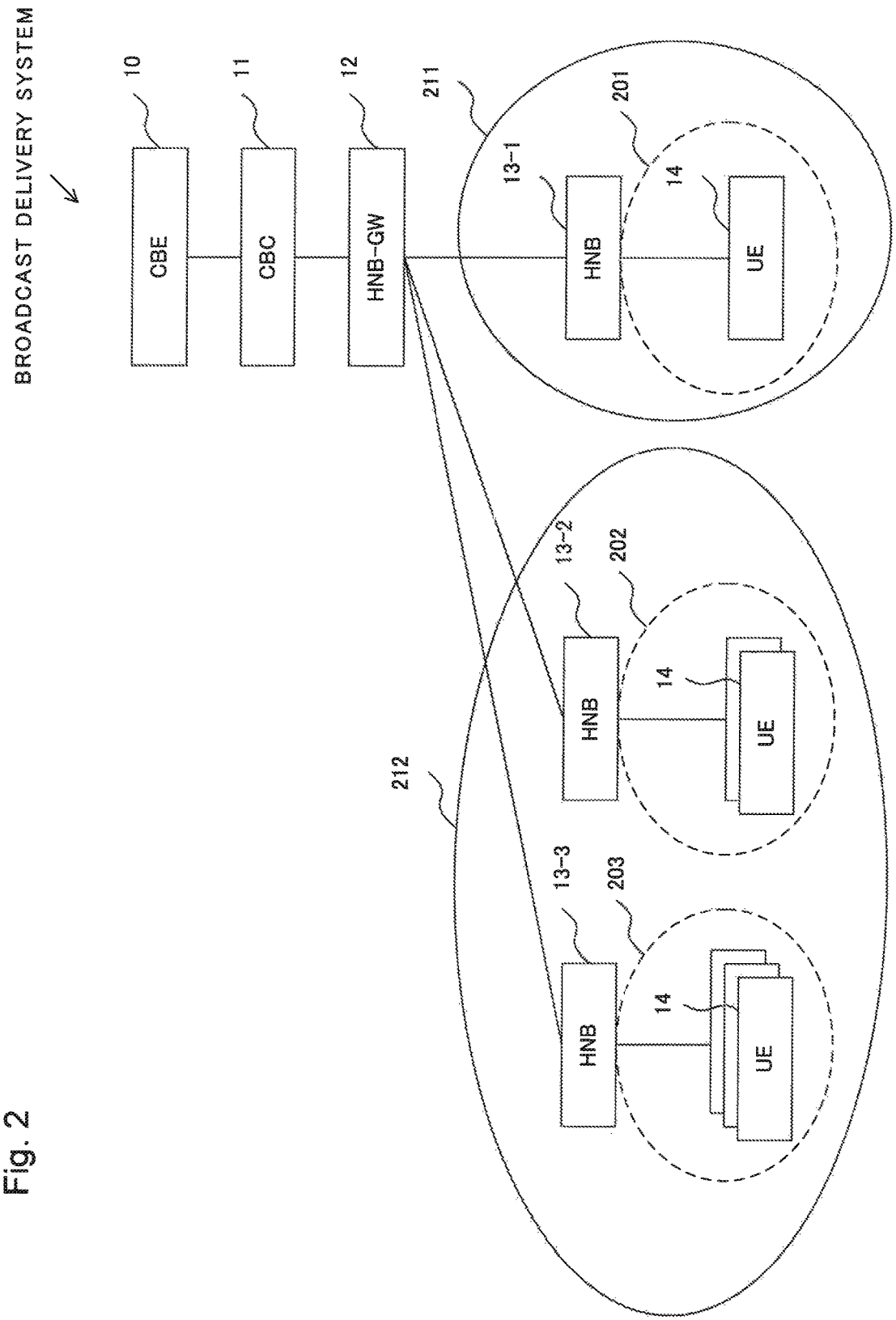
FIG. 2 is a diagram showing one example of an overall configuration of a broadcast delivery system relating to a first example embodiment.

FIG. 2 is a diagram showing one example of an overall configuration of the broadcast delivery system relating to the first example embodiment. The broadcast delivery system shown in FIG. 2 is run in a femto cell network. The broadcast delivery system includes a CBE 10, a CBC 11, an HNB-GW 12, HNBs 13-1 to 13-3, and a plurality of UEs 14. It is noted that the CBE 10, the CBC 11, the HNB-GW 12, and the HNB 13 are equivalent to the aforementioned broadcast delivery device 103, wireless network control device 102, gateway device 101, and femto cell base station 100 respectively.

In the broadcast delivery system, an urgent news message (a CBS message) is delivered from the CBE 10 to the UEs 14.

The CBE 10 is an information processing device (a server) installed at the Meteorological Agency or in a local government and a delivery device for urgent news.

The CBC 11 is a wireless network control device that is connected to the CBE 10 and installed per telecommunications carrier.

The HNB-GW 12 is a gateway device for relaying data that the HNB 13 transmits and receives with a core network. It means the HNB-GW (Home Node B-Gateway) 12 is a relay device in the femto system and functions as a gateway directly connected to a plurality of femto base stations (HNBs: Home Node Bs).

Each of the HNBs 13-1 to 13-3 provides wireless connection for the UEs (terminals) 14 and forms one cell. The HNBs 13-1 to 13-3 are femto cell base stations (small wireless base stations) that respectively cover very narrow ranges. Distances that radio waves emitted by each of the HNBs 13-1 to 13-3 reach are ranges of the cells. For example, the HNB 13-1, the HNB 13-2, and the HNB 13-3 have a cell 201, a cell 202, and a cell 203 respectively. It is noted that the HNBs 13-1 to 13-3 are described simply as "the HNB 13 or HNBs 13" in the following explanation except in special circumstances that need to distinguish the HNBs 13-1 to 13-3.

The UE 14 is a wireless terminal, and a UE residing in each cell of the HNBs 13 can connect the HNB 13. If there are a plurality of UEs 14 in each cell, each UE 14 can connect the HNB 13.

One or more cells are virtually regarded as one, which is equivalent to a service area (SA). In FIG. 2, a service area 211 corresponds to the cell 201. In addition, a service area 212 includes the cells 202 and 203. It is noted that the number of the HNBs is three in FIG. 2, but this is not intended to limit the number of HNBs.

Firstly, an outline of operations of the broadcast delivery system relating to the first example embodiment is explained with reference to FIGS. 2 to 9.

The broadcast delivery system relating to the first example embodiment can deliver an urgent news message to the UEs 14 based on two phases. The first phase is an HNB management phase. The second phase is an information delivery phase.

[HNB Management Phase]

The HNB management phase is the one that manages an HNB state usually occurring in the broadcast delivery system.

Figure 3:
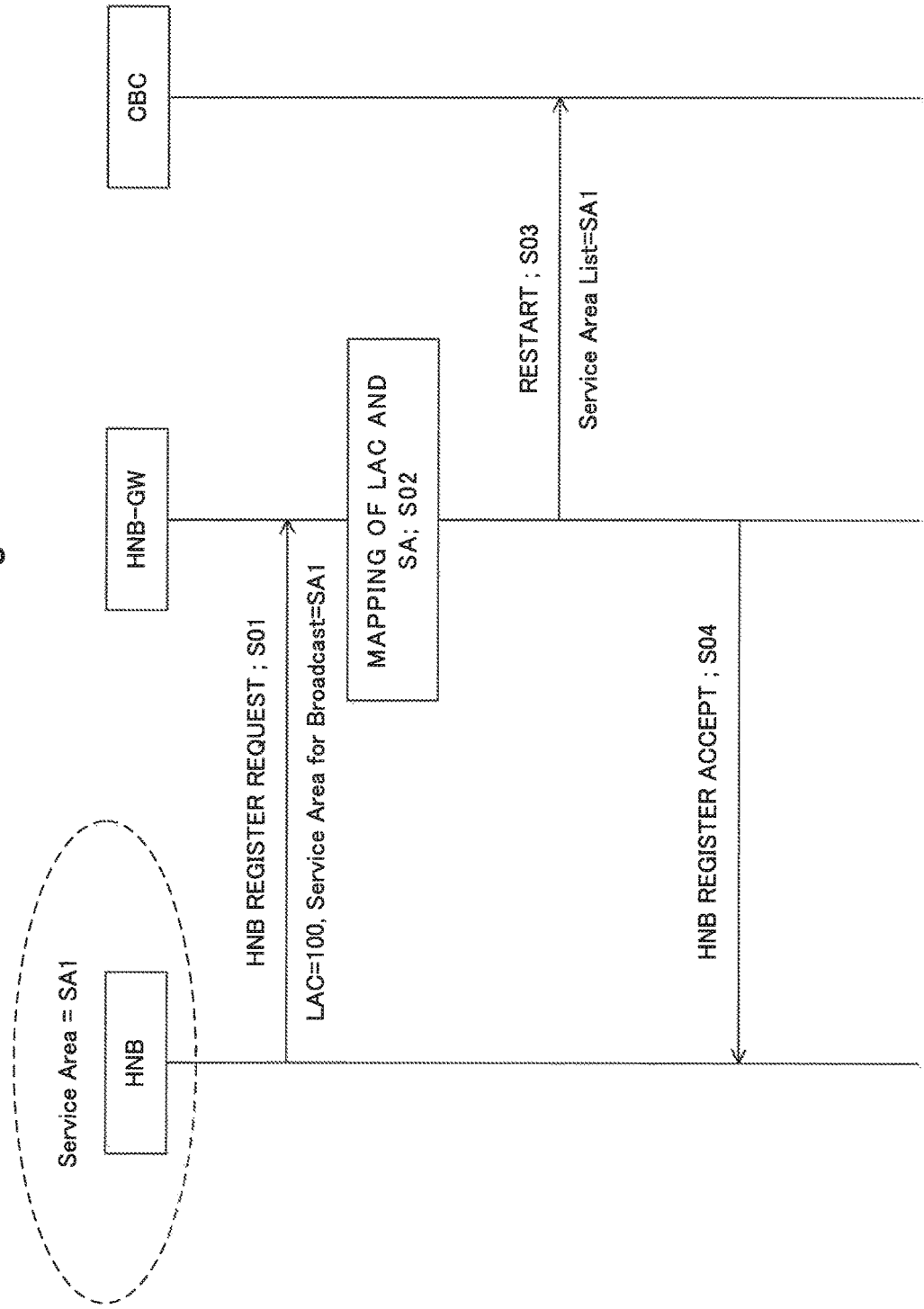
FIG. 3 is a sequence diagram for explaining an HNB management phase.

FIG. 3 is a sequence diagram for explaining the HNB management phase. Referring to FIG. 3, the HNB 13 notifies the HNB-GW 12 of a location information registration request message (HNBAP HNB REGISTER REQUEST; hereinafter referred to as HNB REGISTER REQUEST) when such HNB 13 is turned on and becomes enabled (in the operating state) (step S01).

At that time, the HNB 13 sets an HNB-specific LAC IE (Location Area Code Information Element, hereinafter referred to as LAC) and a service area for broadcast IE (hereinafter referred to as Service Area for Broadcast) in the location information registration request message. In FIG. 3, the LAC is set to 100 and the Service Area for Broadcast is set to SA1.

The HNB-GW 12 that has received the message described above maps and registers the notified LAC and Service Are for Broadcast in a database (a storage unit) (step S02). Specifically, the HNB-GW 12 manages correspondence between an HNB 13 which is equivalent to the notified LACs and a service area to which such HNB 13 belongs by an HNB management table. FIG. 4 is a diagram showing one example of the HNB management table. In the aforementioned example, an entry on the first line in FIG. 4 is added.

Referring to FIG. 3, the HNB-GW 12 notifies the CBC 11 of a RESTART message specified in the SABP (Service Area Broadcast Protocol) (step S03) after the mapping described above. At that time, the HNB-GW 12 notifies the CBC 11 that the service area (SA1 in the example of FIG. 3) becomes enabled if the received location information registration request message is the first message received from such service area (SA). More specifically, the HNB-GW 12 describes the appropriate service area (the service area that the HNB-GW 12 has received the first message) on a service area list (SA List) and transmits the RESTART message to the CBC 11. It means the HNB-GW 12 announces a value of the Service Area for Broadcast IE as a Service Area IE to the CBC 11 by the RESTART message.

The CBC 11 stores the announced service area as a delivery destination of an urgent news message. The CBC 11 stores, on the database of its own device (the storage unit), such announced service area on the SA List after the RESTART message is received. For example, referring to FIG. 2, the HNBs 13-2 and 13-3 have the same value of the Service Area for Broadcast and each notify the HNB-GW 12 by using an HNB REGISTER REQUEST message. The HNB-GW 12 notifies the CBC 11 that the service area 212 becomes active when the aforementioned message is received from two HNBs 13-2 or 13-3. The CBC 11 manages the service area 212 as a delivery target of the urgent news message based on such notification.

The HNB-GW 12 can determine that two HNBs 13 described above reside in the same service area by referencing the HNB management table shown in FIG. 4 when the CBC 11 announces a service area of the Service Area for Broadcast corresponding to the two HNBs 13 described above.

The HNB-GW 12 also replies (returns) an HNB REGISTER ACCEPT message to the HNB 13 (step S04).

Figure 5:
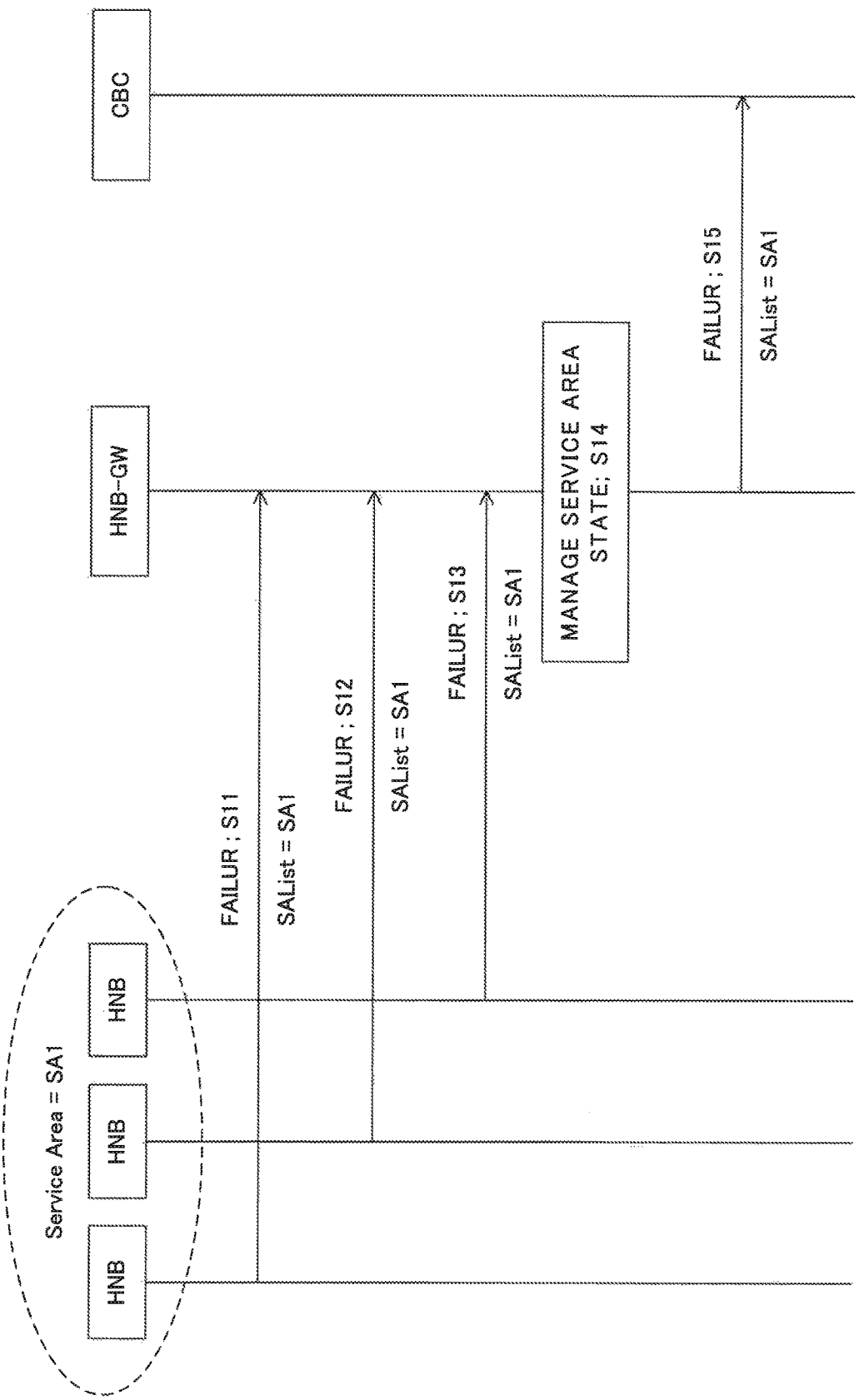
FIG. 5 is a sequence diagram for explaining an HNB management phase.
Figure 6:
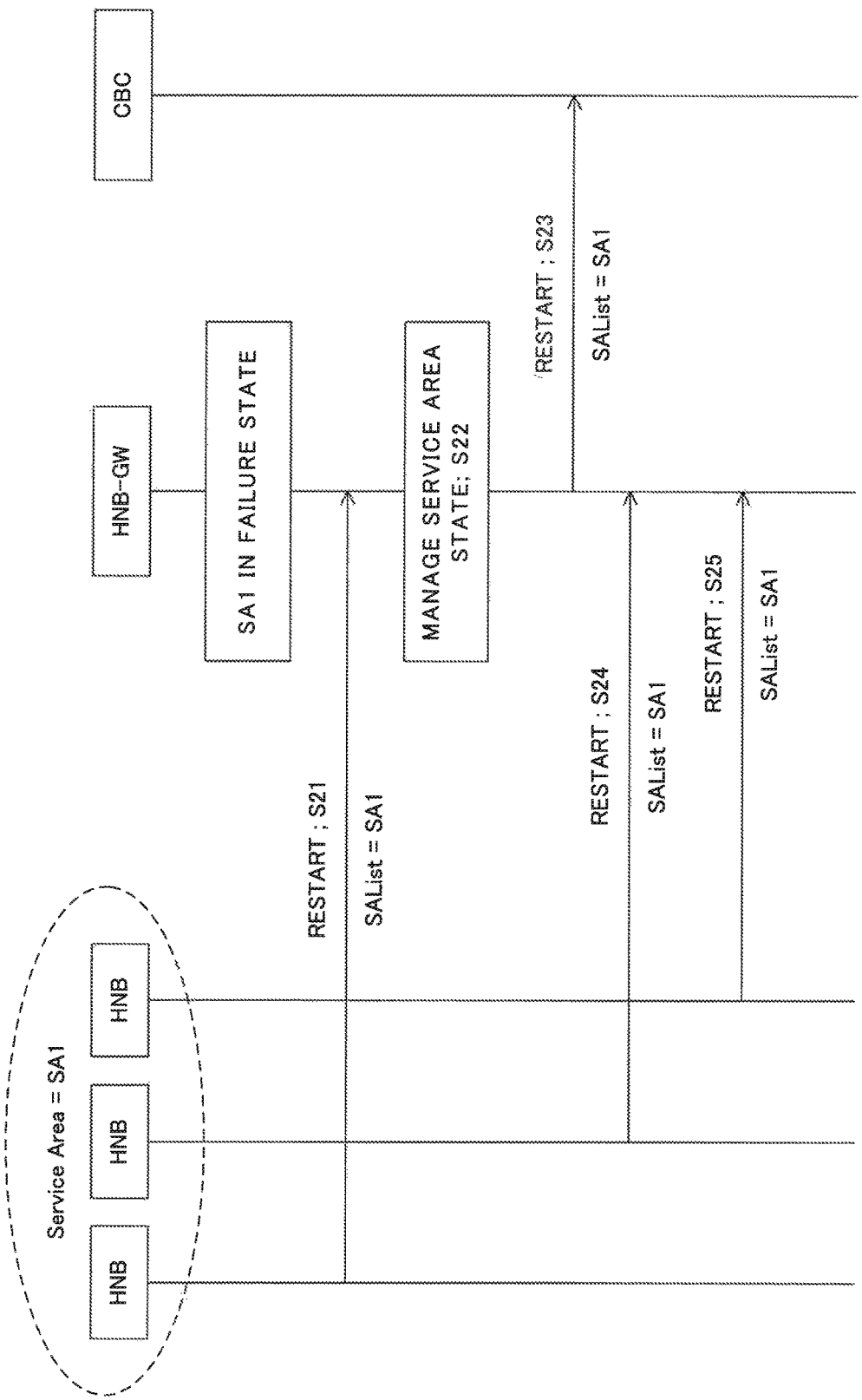
FIG. 6 is a sequence diagram for explaining an HNB management phase.

In the femto system, user's handling or a fault may cause an HNB to be turned off and disconnected. In this case, the HNB 13 notifies the HNB-GW 12 of a FAILURE message specified in the SABP (steps S11 to S13), as shown in FIG. 5.

The HNB-GW 12 receiving such notification manages a state of the service area to which the HNB transmitting the aforementioned FAILURE message belongs (step S14). When the HNB-GW 12 receives the FAILURE message, the state of the HNB 13 transmitting such message is set to "stop (disabled)" to register on the HNB management table (refer to FIG. 4). It is noted that a service area set to "COMPLETE" is in an enabled state and a service area set to "FAILURE" is in a disabled state in FIG. 4.

The HNB-GW 12 manages states as described above every time a FAILURE message is received, and when all HNBs 13 residing in each service area stop (disabled), the HNB-GW 12 registers such service area on the SA List, sets such service area state to disabled (a FAILURE state), and notifies the CBC 11. For example, when the state of the HNB 13 equivalent to a LAC that is 100 or 101 transitions from "operating" to "stopped" in FIG. 4, a service area SA1 to which all LACs of 100 to 102 belong is registered on the SA List and a state of the service area SA1 is set to FAILURE to notify the CBC 11. Specifically, the HNB-GW 12 notifies the CBC 11 of the aforementioned notification (SA1 is disabled) by transmitting the FAILURE message after update of the HNB management table (step S15).

Also, the HNB 13 to which the service area announced to the CBC 11 as the FAILURE state belongs may restart. For example, one of the HNBs 13 transmits a RESTART message specified in the SABP (step S21), as shown FIG. 6. In this case, when such message is received, the HNB-GW 12 manages service area states by setting appropriate service areas on the HNB management table to a COMPLETE state (step S22). For example, the service area SA2 is in a FAILURE state in FIG. 4, but the state of the service area SA2 is set to COMPLETE when an HNB 13 corresponding to the LAC that is 200 or 201 restarts.

After the update of the HNB management table, the HNB-GW 12 sets an enabled service area on the SA List to notify the CBC 11 by the RESTART message (step S23). It is noted that a RESTART message is discarded by the HNB-GW 12 when the HNB-GW 12 receives such message from another HNB 13 after transmitting the RESTART message to the CBC 11 (steps S24 and S25). This is because state transition of such service area (state transition from FAILURE to COMPLETE) is completed when one of a plurality of HNBs 13 residing in a service area becomes enabled.

[Information Delivery Phase]

Subsequently, the information delivery phase is explained.

The information delivery phase is the one which an urgent news message is delivered to each UE 14 when an enormous earthquake or the like occurs.

Figure 7:
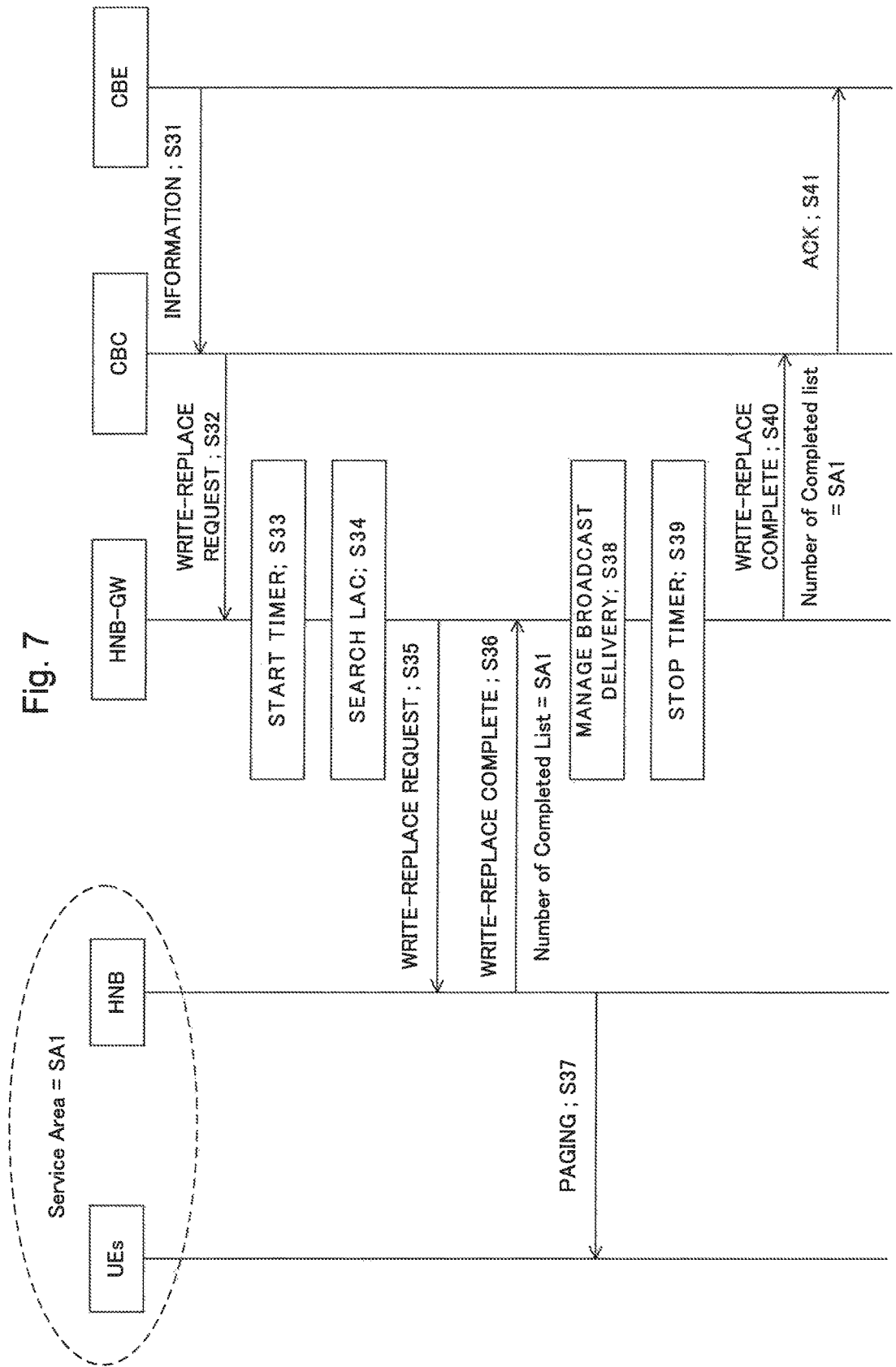
FIG. 7 is a sequence diagram for explaining an information delivery phase.

FIG. 7 is a sequence diagram for explaining the information delivery phase. When an enormous earthquake or the like occurs, an urgent news message is delivered as an INFORMATION message from the CBE 10 to the CBC 11 at a time of such earthquake occurrence (step S31).

The CBC 11 that has received such INFORMATION message creates areas to which the urgent news message should be delivered as a service area list (the SA List). The CBC 11 sets such service area list in a WRITE-REPLACE REQUEST message specified by the SABP to deliver the message to the HNB-GW 12 (step S32).

When such message is received, the HNB-GW 12 starts a response receiving timer (hereinafter simply referred to as a timer) (step S33).

Next, the HNB-GW 12 searches the HNB management table stored in the HNB management phase to identify a service area that conforms to the service area on the service area list (SA List) included in the WRITE-REPLACE REQUEST message and a LAC corresponding to the service area. For example, it is assumed that the CBC 11 sets SA1 on the service area list. In this case, referring to FIG. 4, the service area SA1 and LACs of 100 to 102 described on the first to third lines are identified.

Next, the HNB-GW 12 transmits the WRITE-REPLACE REQUEST message to each HNB 13 based on the identified information above (step S35).

When the massage described above is successfully received, the HNB 13 receiving the message returns a WRITE-REPLACE COMPLETE message to the HNB-GW 12 (step S36). At that time, the HNB 13 sets an appropriate service area (the service area to which the HNB 13 belongs; that is to say SA1 in the example of FIG. 7) on the Number of Completed List and returns the foregoing message.

The HNB 13 broadcasts the urgent news message to subordinate UEs 14 by PAGING (step S37).

The HNB-GW 12 manages the broadcast delivery status for the HNB 13 in response to receiving the WRITE-REPLACE COMPLETE message (step S38). Specifically, the HNB-GW 12 manages a state of the broadcast delivery to each service area by using the broadcast delivery management table.

FIG. 8 is a diagram showing one example of the broadcast delivery management table. It is noted that a service area that is set to "COMPLETE" is the one where broadcast delivery is completed (successful) and a service area that is set to "FAILURE" is the one where broadcast delivery is not completed (or failed) in FIG. 8.

When the HNB-GW 12 first receives the WRITE-REPLACE COMPLETE message from a service area (SA1 in the example described above), such service area is set to a reception-completed state (the COMPLETE state). The HNB-GW 12 also registers such service area on the Number of Completed List.

The HNB-GW 12 stops the timer when the states of the broadcast delivery to all the subordinate service areas transition to the reception-completed state (the COMPLETE state) during starting the timer (step S39).

Then, the HNB-GW 12 returns the WRITE-REPLACE COMPLETE message to the CBC 11 (step S40). At that time, the Number of Completed List on which the service area SA1 is set is registered in the WRITE-REPLACE COMPLETE message.

The CBC 11 receiving such message returns ACK to the CBE 10 (step S41).

[CBC Configuration]

Figure 9:
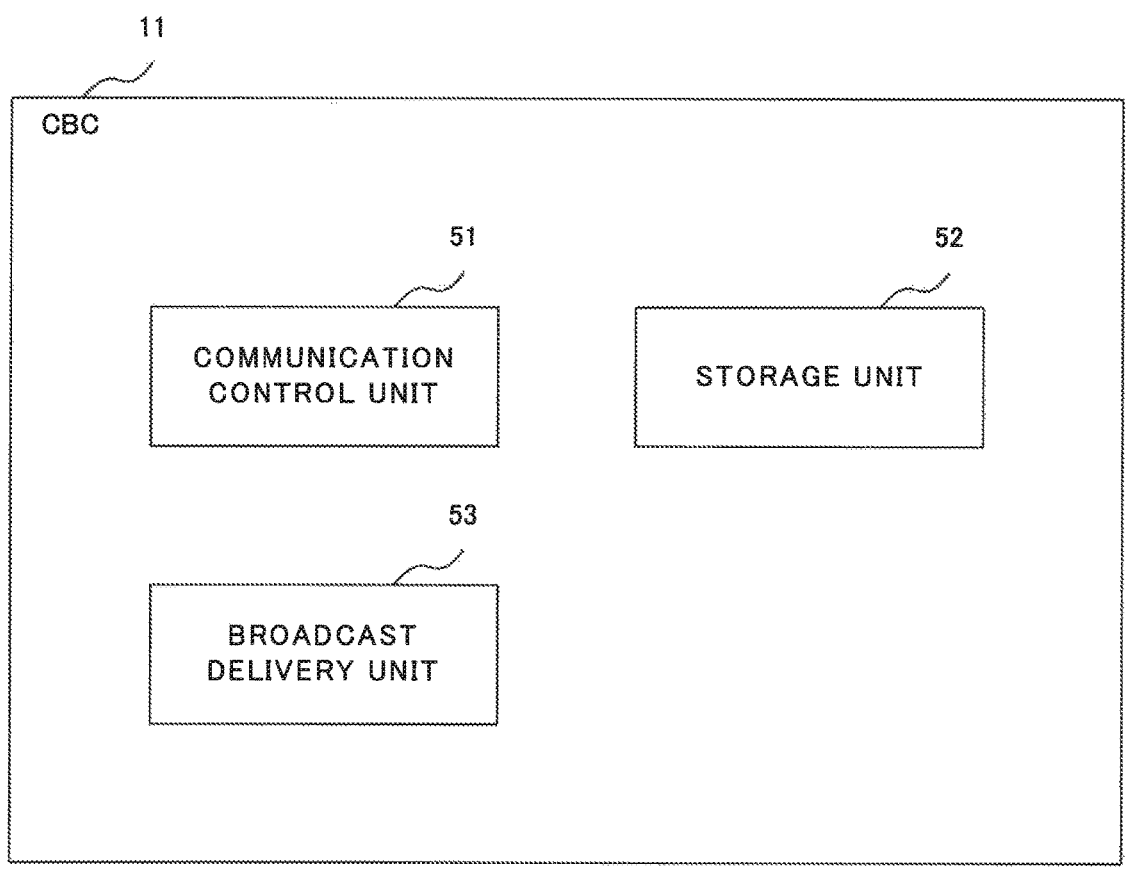
FIG. 9 is a diagram showing one example of a CBC's internal configuration relating to the first example embodiment.

FIG. 9 is a diagram showing one example of an internal configuration of the CBC 11. Referring to FIG. 9, the CBC 11 includes a communication control unit 51, a storage unit 52, and a broadcast delivery unit 53.

The communication control unit 51 is means of controlling communication with the CBE 10 and the HNB-GW 12. The storage unit 52 is means of storing information necessary for operations of the CBC 11. For example, the storage unit 52 stores a service area on the SA List that is notified by the HNB-GW 12. The broadcast delivery unit 53 is means of delivering an urgent news message to the HNB-GW 12 when an INFORMATION message is received from the CBE 10.

[HNB Configuration]

Figure 10:
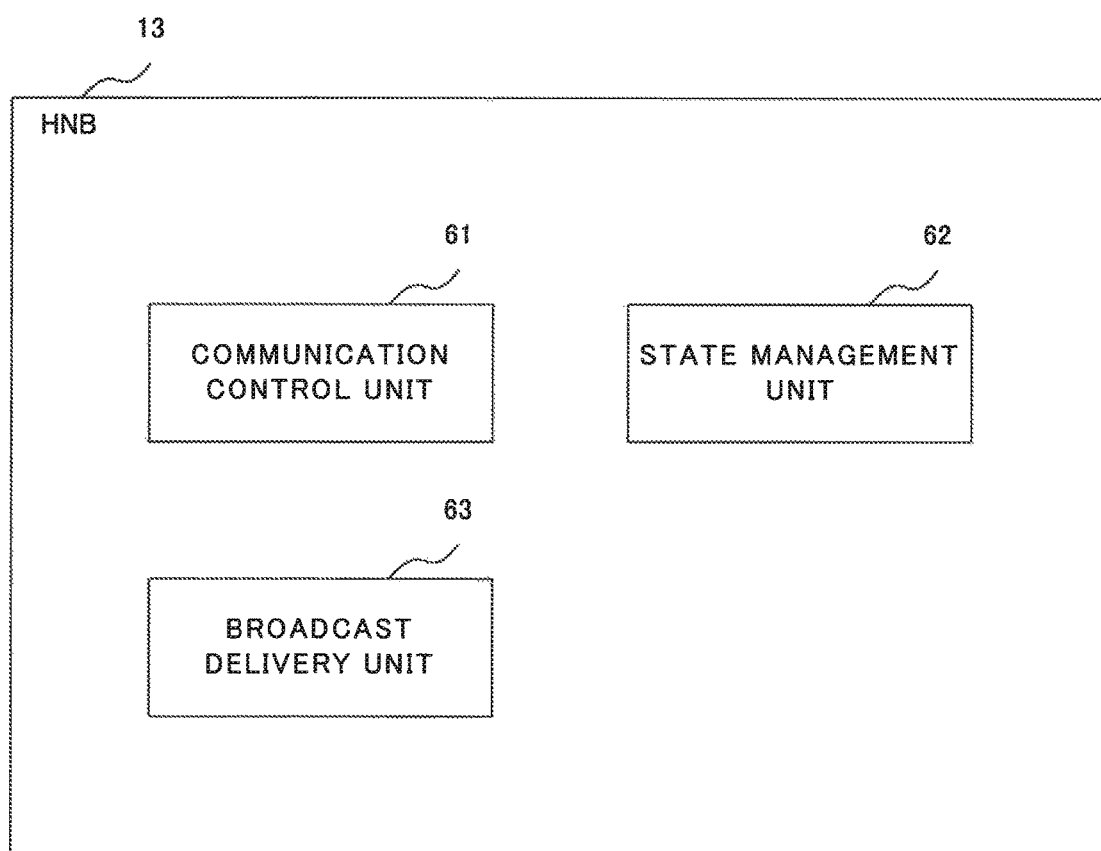
FIG. 10 is a diagram showing one example of an HNB's internal configuration relating to the first example embodiment.

FIG. 10 is a diagram showing one example of an internal configuration of the HNB 13. Referring to FIG. 10, the HNB 13 includes a communication control unit 61, a state management unit 62, and a broadcast delivery unit 63.

The communication control unit 61 is means of controlling communication with the HNB-GW 12 and a UE 14.

The state management unit 62 is means of managing a state of its own device. For example, when its own state is changed because of start, stop, restart, or the like, the state management unit 62 notifies the HNB-GW 12 of such change. At that time, the state management unit 62 transmits each kind of messages relating to a REGISTER REQUEST, FAILURE, and RESTART to the HNB-GW 12 through the communication control unit 61.

The broadcast delivery unit 63 is means of controlling broadcast delivery to a UE. For example, the broadcast delivery unit 63 is means of delivering an urgent news message to a UE 14 existing in its own cell when a WRITE-REPLACE REQUEST message is received from the HNB-GW 12.

[HNB-GW Configuration]

Figure 11:
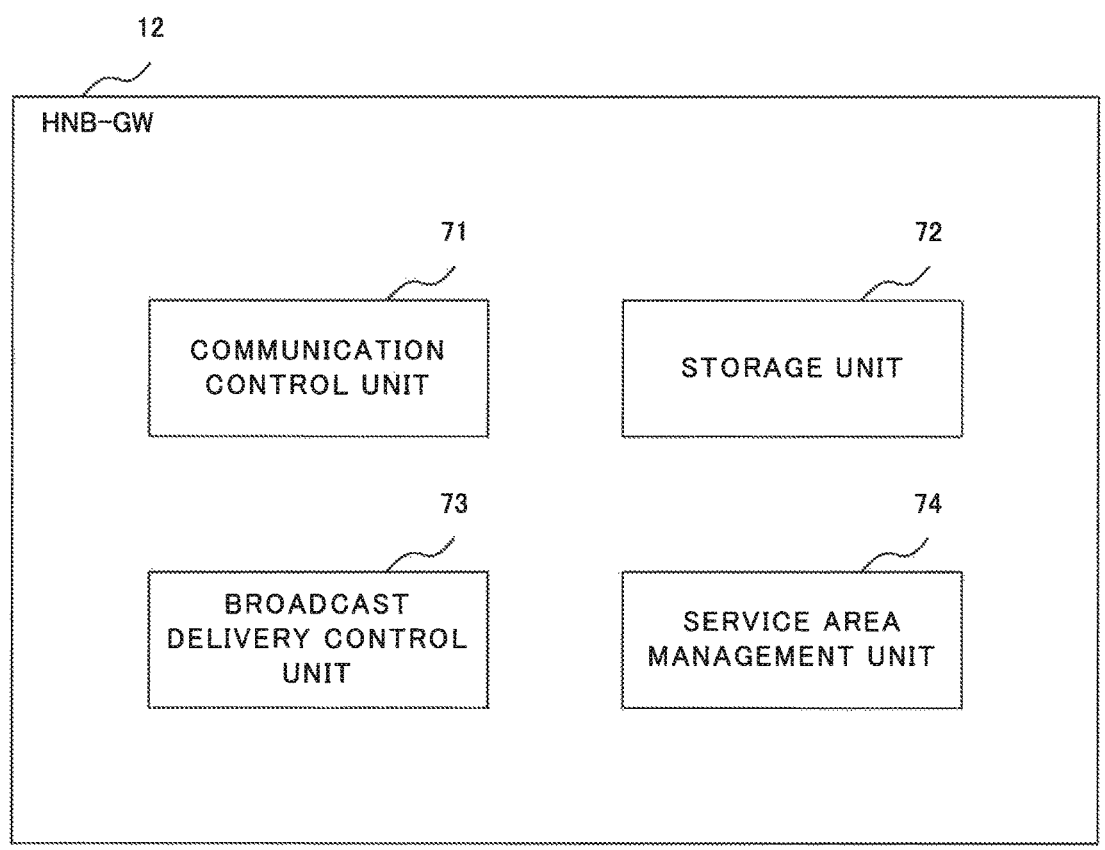
FIG. 11 is a diagram showing one example of an HNB-GW's internal configuration relating to the first example embodiment.

FIG. 11 is a diagram showing one example of an internal configuration of the HNB-GW 12. Referring to FIG. 11, the HNB-GW 12 includes a communication control unit 71, a storage unit 72, a broadcast delivery control unit 73, and a service area management unit 74.

The communication control unit 71 is means of controlling communication with the CBC 11 and the HNB 13. The storage unit 72 is means of storing information necessary for operations of the HNB-GW 12. The storage unit 72 also stores the HNB management table and the broadcast delivery management table. The broadcast delivery control unit 73 operates mainly in the information delivery phase. The service area management unit 74 operates mainly in the HNB management phase.

Detailed operations of each of the broadcast delivery control unit 73 and the service area management unit 74 are explained as follows.

In this case, the Cell Broadcast Service (CBS) is specified in NPL 1, as mentioned above. In addition, a protocol between the CBC and the RNC (HNB-GW) is specified as the SABP by NPL 2. In NPL 2, what is a message transmitted from the CBC to the RNC and has a response from the HNB whether message delivery is successful or fails is defined as Class 1. Also, what does not have a response to message delivery from the HNB is defined as Class 2. It is noted that these details are disclosed in the chapter 3.1 of NPL 2. Specifically, Classes 1 and 2 are categorized as follows.

Class 1
1.1; WRITE-REPLACE
1.2; WRITE-REPLACE COMPLETE
1.3; WRITE-REPLACE FAILURE
2.1; KILL
2.2; KILL COMPLETE
2.3; KILL FAILURE
3.1; LOAD QUERY
3.2; LOAD QUERY COMPLETE
3.3; LOAD QUERY FAILURE
4.1; MESSAGE STATUS QUERY
4.2; MESSAGE STATUS QUERY COMPLETE
4.3; MESSAGE STATUS QUERY FAILURE
5.1; RESET
5.2; RESET COMPLETE
5.3; RESET FAILURE
Class 2
6; RESTART
7; FAILURE
8; ERROR INDICATION

[Broadcast Delivery Control Unit]

Referring now to FIGS. 12 to 20, operations of the broadcast delivery control unit 73 that receives each signal of Class 1 described above are explained.

Figure 12:
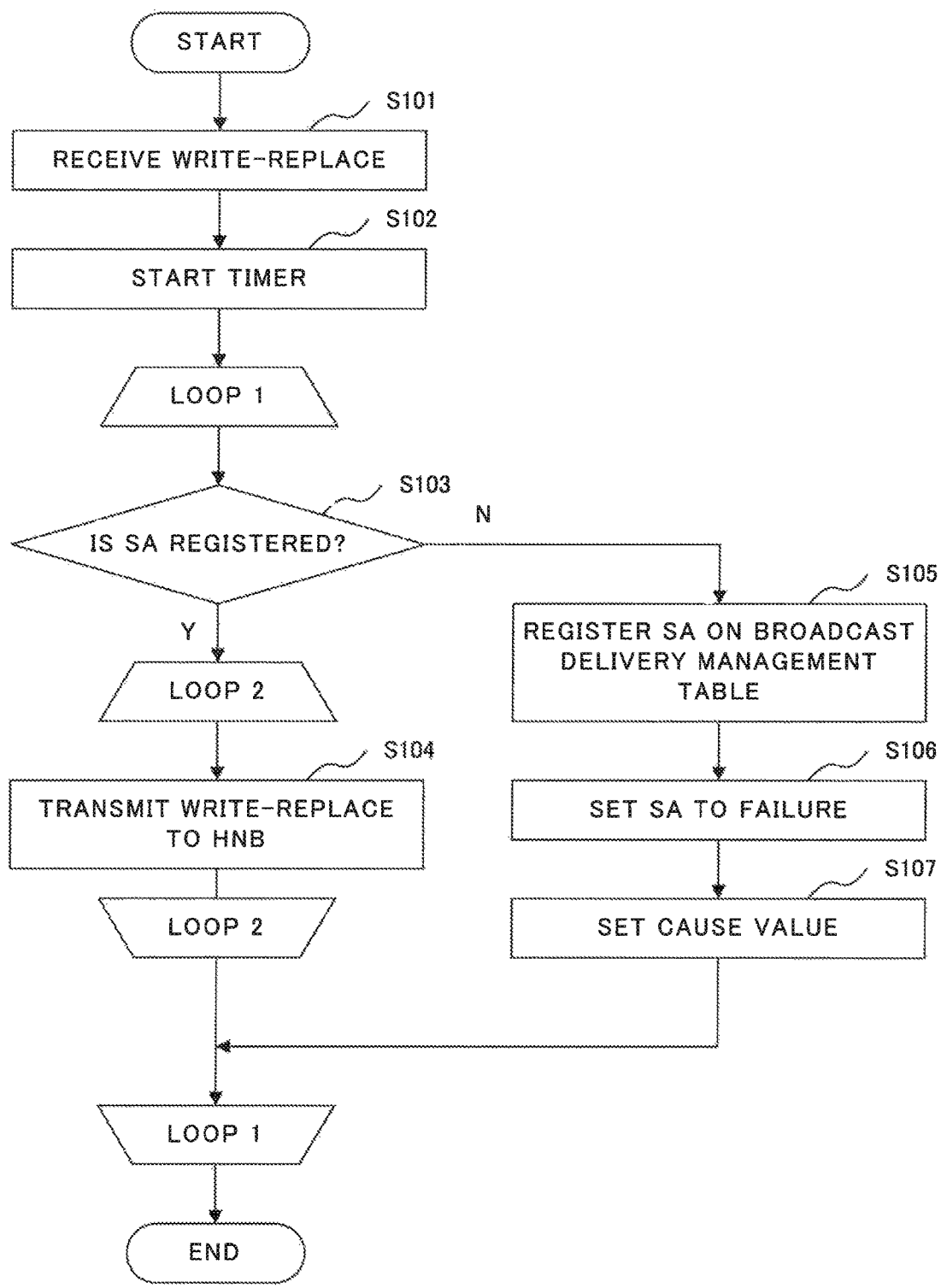
FIG. 12 is a flowchart for explaining operations of a broadcast delivery control unit.

When a Class 1 message is received from the CBC 11, the broadcast delivery control unit 73 executes processes shown in FIG. 12. It is noted that FIG. 12 shows operations in a case of receiving a WRITE-REPLACE message from the CBC 11.

When the WRITE-REPLACE message or the like is received (step S101), the broadcast delivery control unit 73 starts a timer (step S102).

Then, the broadcast delivery control unit 73 repeats processes on steps S103 to S107 as many times as the number of service areas set on the service area list (the SA List) (the process of loop 1).

The broadcast delivery control unit 73 determines whether the service areas set on the service area list are registered on the HNB management table (refer to FIG. 4) or not (step S103). It means the broadcast delivery control unit 73 searches the HNB management table for the service areas set on the service area list to identify the corresponding LACs. When the LACs are identified, the HNBs 13 required to deliver an urgent news message are identified.

When the service areas are registered (the Yes branch on step S103), the broadcast delivery control unit 73 repeats a process of transmitting the WRITE-REPLACE message to all identified HNBs 13 (HNBs 13 under the appropriate service areas) (step S104) (the process of loop 2).

On the other hand, when the service areas are not registered (the No branch on step S103), the broadcast delivery control unit 73 registers the service areas set on the service area list in the HNB management table and the broadcast delivery management table (step S105). For example, referring to FIGS. 4 and 8, the broadcast delivery control unit 73 creates and adds an entry corresponding to a service area SA4 on the HNB management table and the broadcast delivery management table when a service area relating to the service area SA4 is announced by the CBC 11 and such service area SA4 is not registered on the foregoing two tables.

The broadcast delivery control unit 73 also sets a state of the aforementioned service area added on the broadcast delivery management table to FAILURE (step S106) and registers a Cause value (step S107).

It is noted that the broadcast delivery control unit 73 changes a message on step 104 to another message (KILL/LOAD QUERY/Message STATUS QUERY/RESET) to execute the process when the aforementioned message other than the WRITE-REPLACE message is received on step S101.

When a response is received from the HNB 13, the broadcast delivery control unit 73 executes processes shown in FIGS. 13 to 16.

Figure 13:
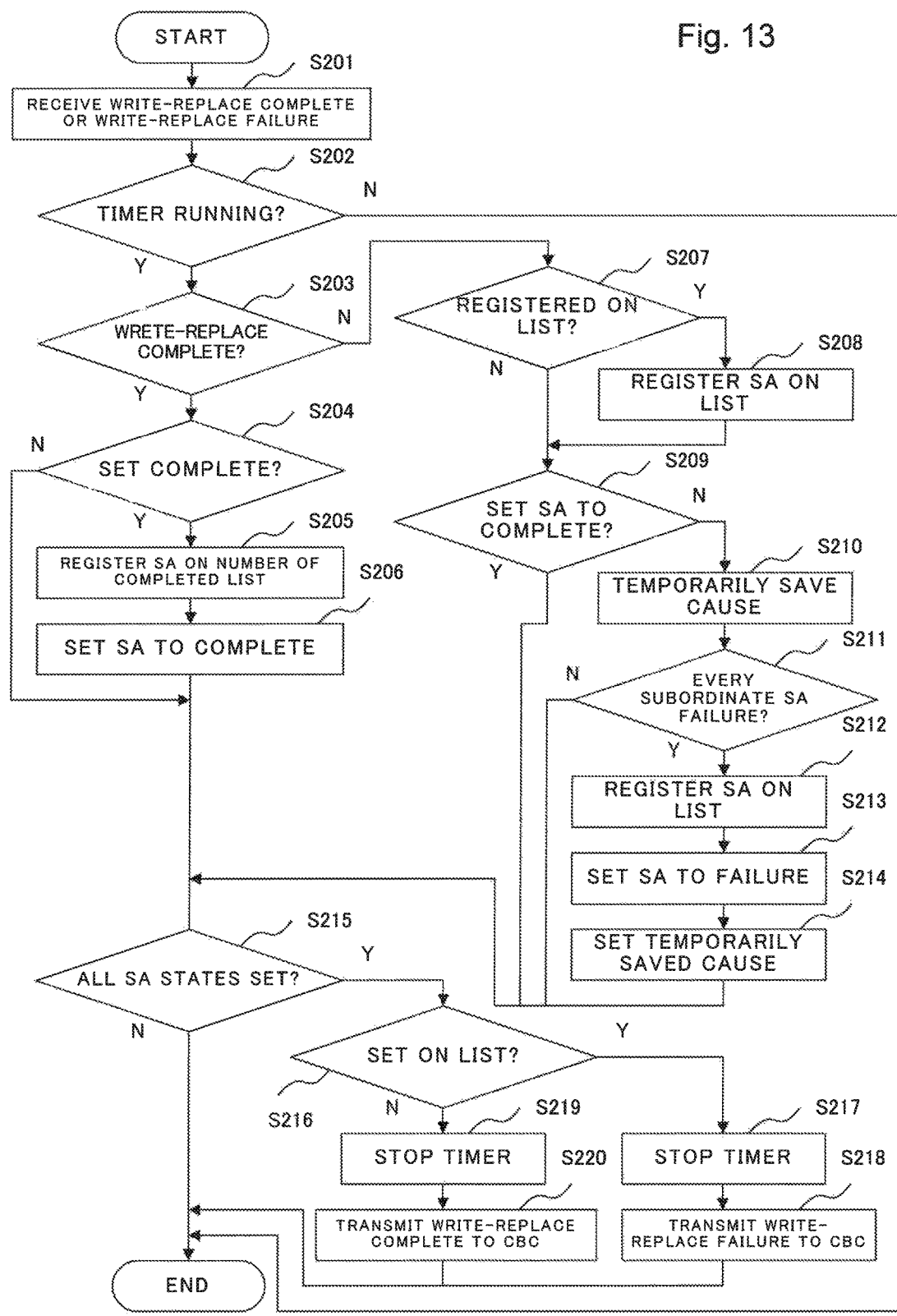
FIG. 13 is a flowchart for explaining operations of the broadcast delivery control unit.

Referring to FIG. 13, the broadcast delivery control unit 73 receives a WRITE-REPLACE COMPLETE or a WRITE-REPLACE FAILURE message from the HNB 13 (step S201).

Then, the broadcast delivery control unit 73 determines whether the timer is running or not (step S202). When the timer is not running (the No branch on step S202), the process is terminated.

When the timer is running (the Yes branch on step S202), the processes after step S203 are executed.

On step S203, the broadcast delivery control unit 73 determines whether a received message is a WRITE-REPLACE COMPLETE message or not (step S203). If the received message is the WRITE-REPLACE COMPLETE message (the Yes branch on step S203), the broadcast delivery control unit 73 determines whether a service area appropriate to the aforementioned message is set to COMPLETE or not (step S204).

When the service area is set to COMPLETE (the Yes branch on step S204), the broadcast delivery control unit 73 registers the appropriate service area on the Number of Completed List (step S205). Then, the broadcast delivery control unit 73 sets a broadcast delivery state of the appropriate service area to COMPLETE (step S206).

If the received message is not the WRITE-REPLACE COMPLETE message (the No branch on step S203), the broadcast delivery control unit 73 determines whether the Number of Completed List is registered in the WRITE-REPLACE FAILURE message or not (step S207).

When the service area is registered on the list (the Yes branch on step S207), the broadcast delivery control unit 73 registers the appropriate service area on the Number of Completed List (step S208).

When the service area is not registered on the list (the No branch on step S207), the broadcast delivery control unit 73 determines whether a broadcast delivery state of the appropriate service area is set to COMPLETE or not (step S209). When COMPLETE is not set (the No branch on step S209), the broadcast delivery control unit 73 temporarily saves a Cause value of the FAILURE message (step S210).

Then, the broadcast delivery control unit 73 determines whether messages received from all HNBs 13 under the appropriate service area are WRITE-REPLACE FAILURE messages or not (step S211).

If the received messages are WRITE-REPLACE FAILURE messages, the broadcast delivery control unit 73 registers the appropriate service area in a FAILURE LIST IE and sets its state in the broadcast delivery management table to FAILURE (step S212 and S213). In addition, the temporarily saved Cuase value is set (step S214).

On step S215, the broadcast delivery control unit 73 determines whether a broadcast delivery state is set for every service area or not. When the states are set (the Yes branch on step S215), the broadcast delivery control unit 73 determines whether a service area set to FAILURE exists in the FAILURE LIST or not (step S216).

If the service area set to FAILURE exists (the Yes branch on step S216), the broadcast delivery control unit 73 stops the timer (step S217) and transmits a WRITE-REPLACE FAILURE message to the CBC 11 (step S218).

If the service area set to FAILURE does not exist (the No branch on step S216), the broadcast delivery control unit 73 stops the timer (step S219) and transmits a WRITE-REPLACE COMPLETE message to the CBC 11 (step S220).

It is noted that the broadcast delivery control unit 73 changes a message on steps S201, S203, S207, S211, S218, and S220 to another message (KILL/LOAD QUERY/Message STATUS QUERY) to execute the process if the aforementioned message other than a WRITE-REPLACE COMPLETE or FAILURE message is received.

Figure 14:
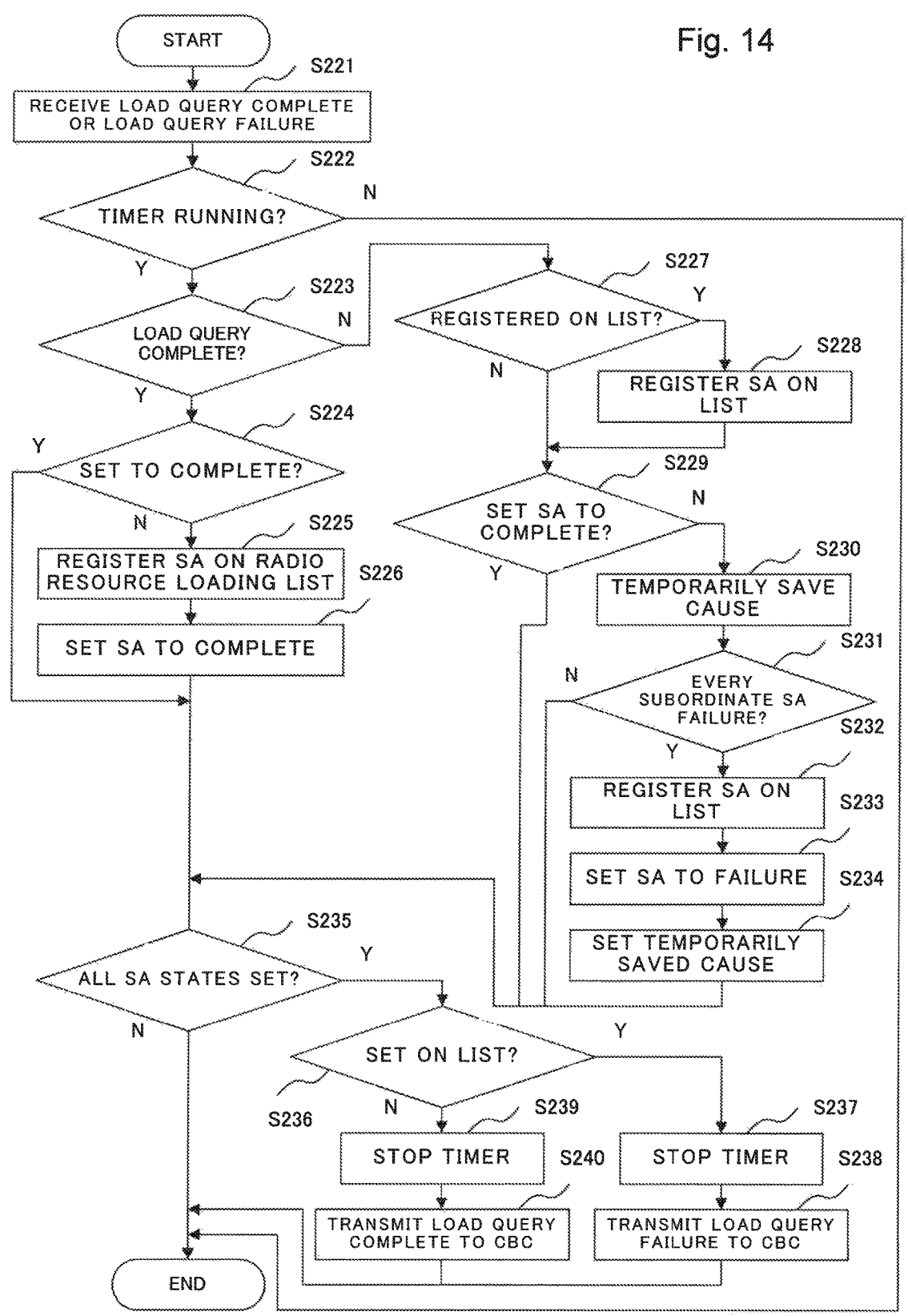
FIG. 14 is a flowchart for explaining operations of the broadcast delivery control unit.

FIG. 14 is a flowchart when the broadcast delivery control unit 73 receives a LOAD QUERY COMPLET or LOAD QUERY FAILURE message from the HNB 13. The broadcast delivery control unit 73 basically operates the same as the time of receiving a WRITE-REPLACE related message shown in FIG. 13 also when a LOAD QUERY related message is received. Differences are that messages on steps 221, S223, S227, S231, S238, and S240 in FIG. 14 are LOAD QUERY messages and that a list on which the appropriate service area is registered is changed to a Radio Resource Loading List on steps S225 and S228.

Figure 15:
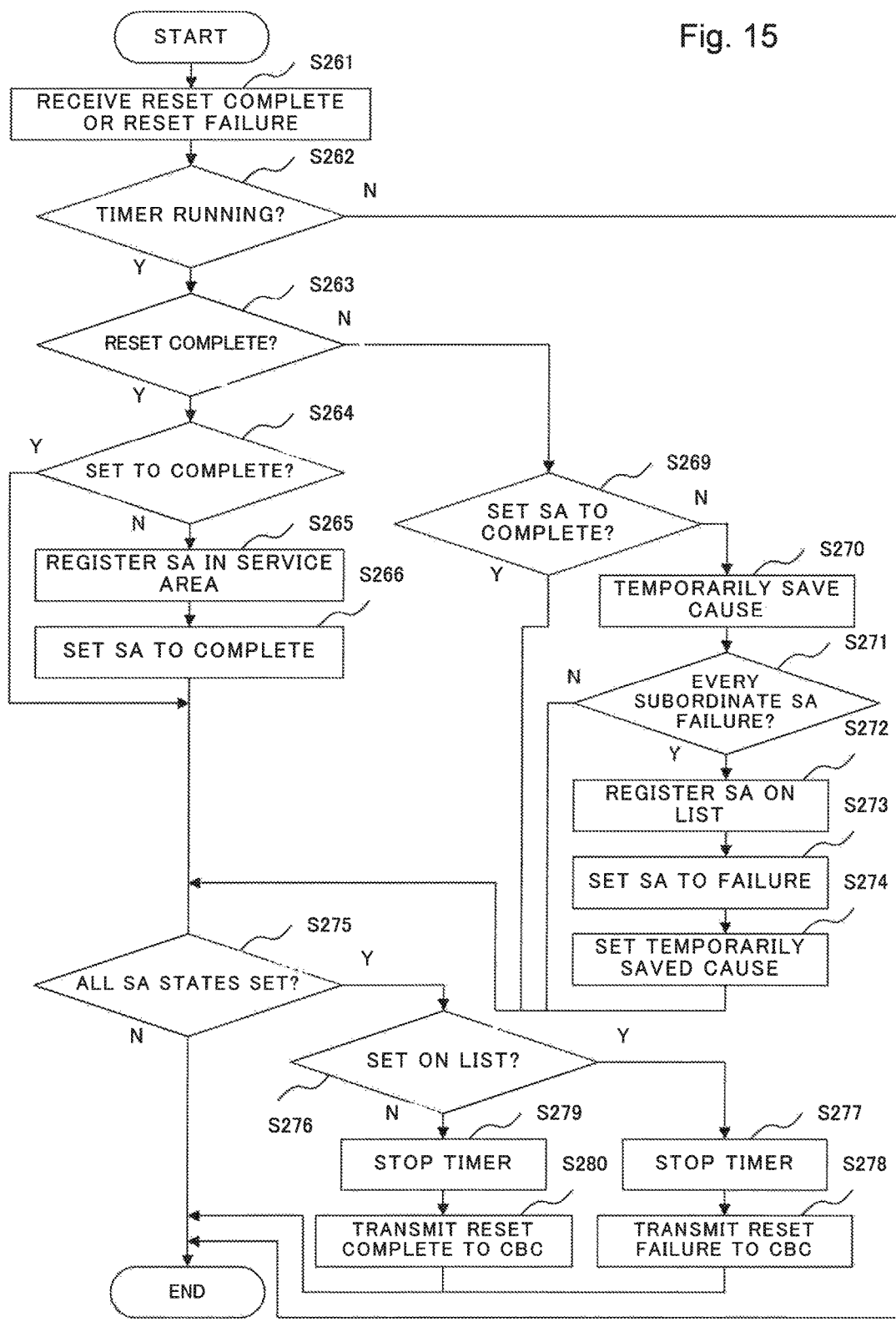
FIG. 15 is a flowchart for explaining operations of the broadcast delivery control unit.

FIG. 15 is a flowchart when the broadcast delivery control unit 73 receives a RESET COMPLETE or RESET FAILURE message from the HNB 13. The broadcast delivery control unit 73 basically operates the same as the time of receiving a WRITE-REPLACE related message shown in FIG. 13 also when a RESET related message is received. Differences are that messages on steps 261, S263, S271, S278, and S280 in FIG. 15 are RESET messages, that a list on which the appropriate service area is registered is changed to a SERVICE AREA IE on step S265, and that there is no process equivalent to steps S207 and S208.

Figure 16:
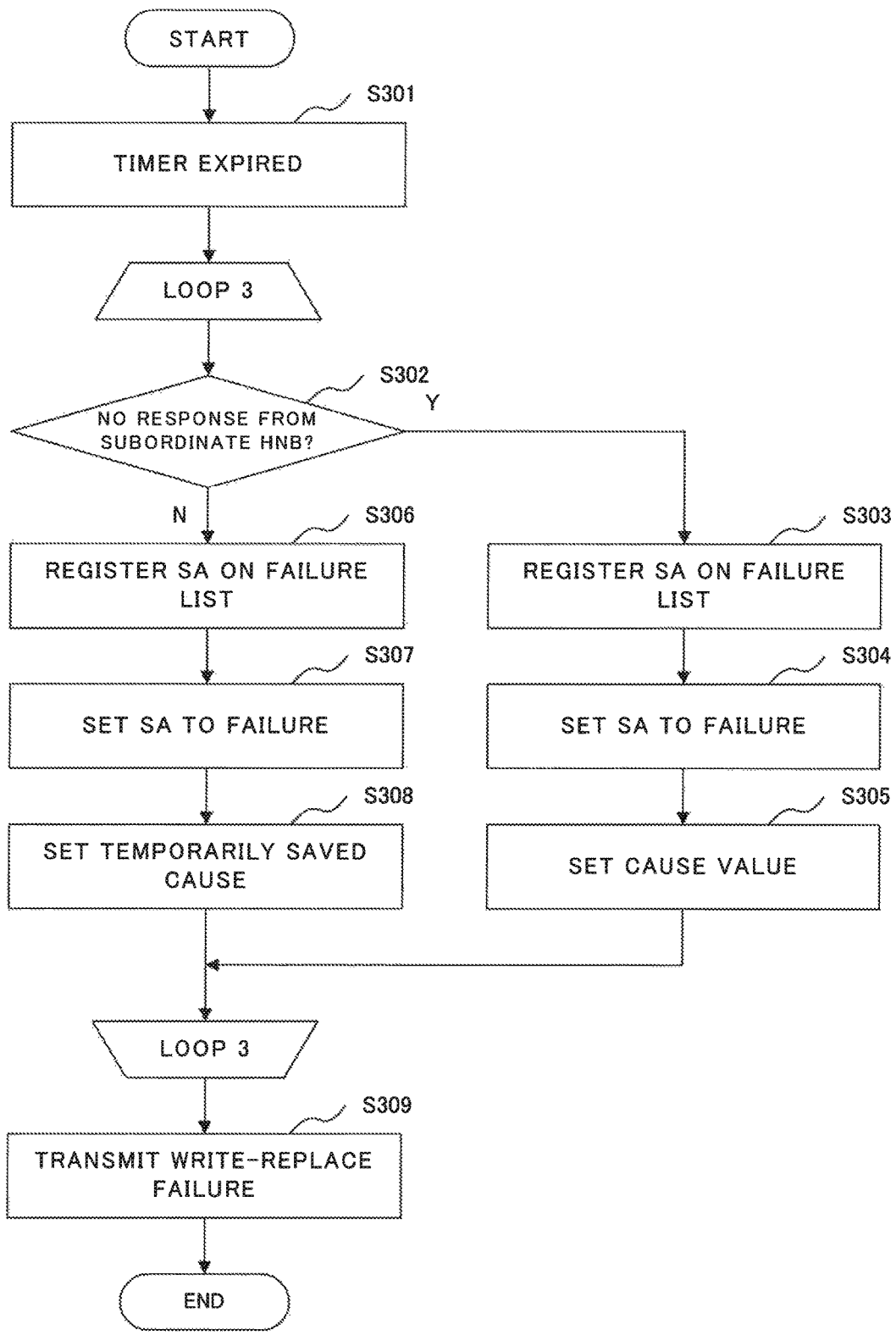
FIG. 16 is a flowchart for explaining operations of the broadcast delivery control unit.

FIG. 16 is a flowchart showing one example of operations of the broadcast delivery control unit 73 when the started timer expires.

When the timer expires (step S301), the broadcast delivery control unit 73 repeats the processes from steps S302 to S308 as many times as the number of the service areas whose state has not been decided (the process of loop 3).

The broadcast delivery control unit 73 determines whether there is a response from a subordinate HNB 13 or not after the timer expiration (step S302).

If there is no response (the Yes branch on step S302), the broadcast delivery control unit 73 registers the appropriate service area in a FAILURE LIST IE and sets a state of such service area to FAILURE (steps S303 and S304). The broadcast delivery control unit 73 sets a Cause value that is set in a FAILURE message (step S305).

On the other hand, if there is a response (the No branch on step S303), the broadcast delivery control unit 73 registers the appropriate service area in the FAILURE LIST IE and sets a state of such service area to FAILURE (steps S306 and S307). The broadcast delivery control unit 73 sets a Cause value that is temporarily set by a FAILURE message (step S308).

Then, the broadcast delivery control unit 73 transmits WRITE-REPLACE FAILURE to the CBC 11 (step S309).

Figure 17:
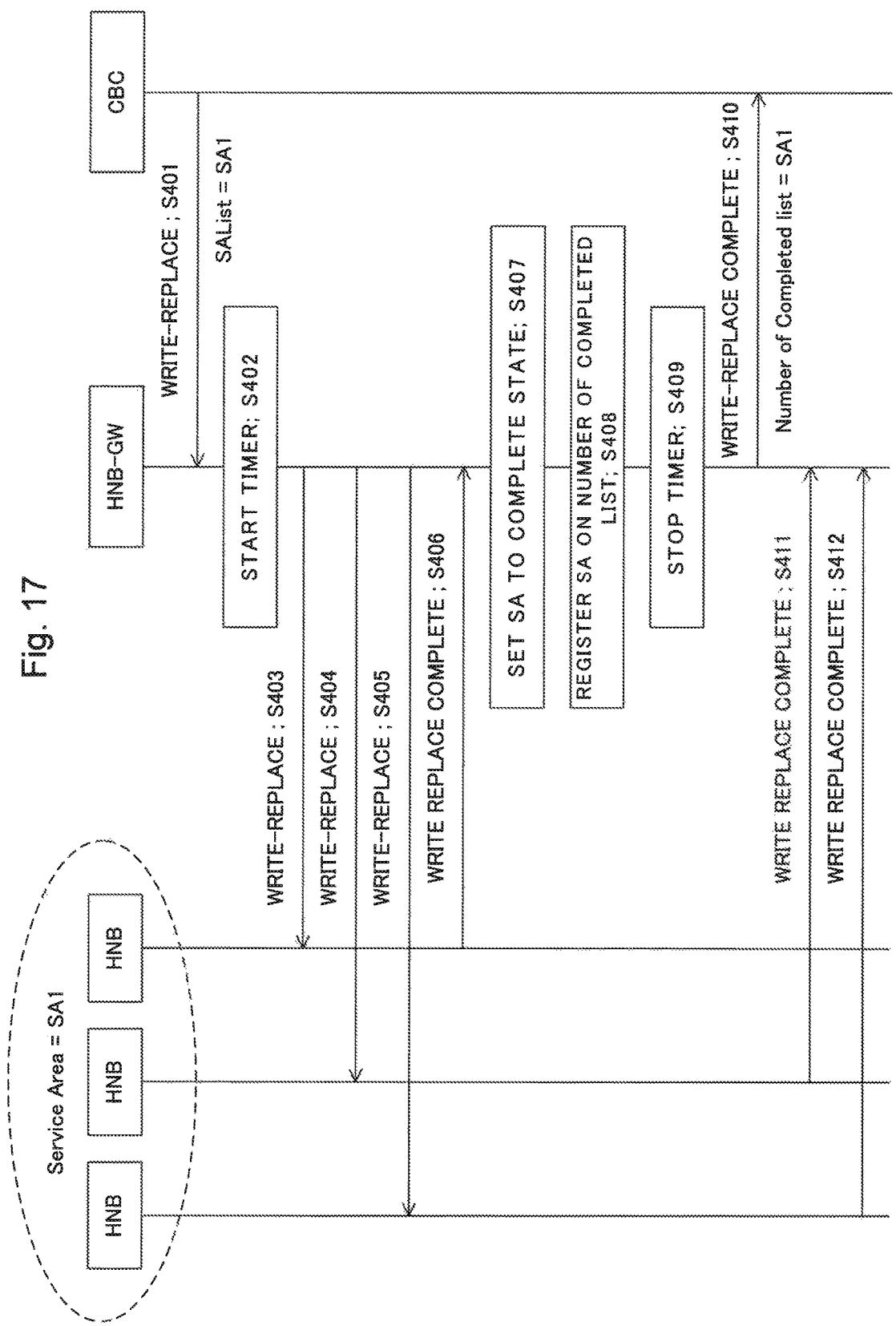
FIG. 17 is a sequence diagram for explaining operations of the broadcast delivery control unit.
Figure 18:
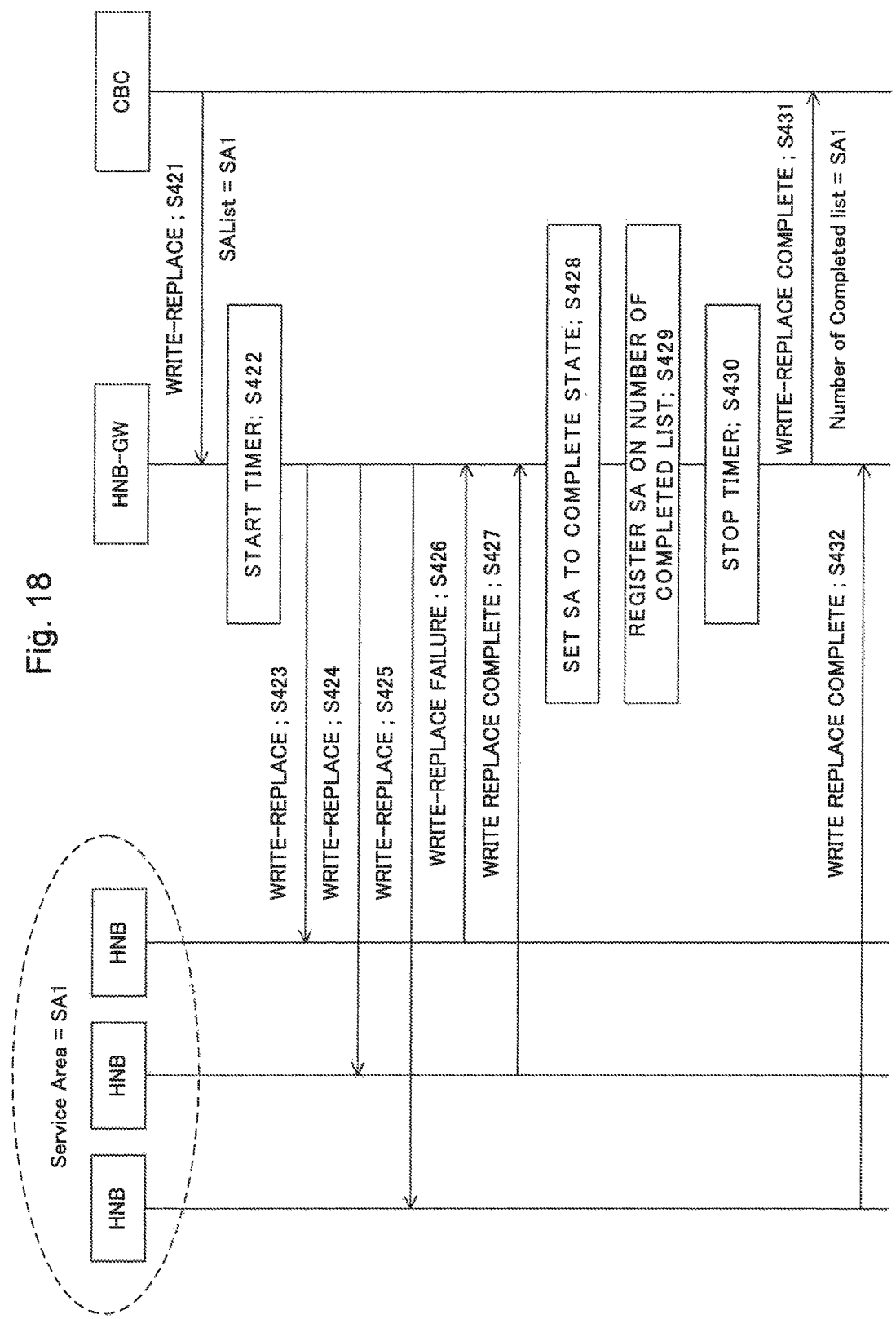
FIG. 18 is a sequence diagram for explaining operations of the broadcast delivery control unit.

With reference to FIGS. 17 and 18, when a WRITE-REPLACE COMPLETE message is received from any one of the HNBs 13 included in the subordinate service area, the HNB-GW 12 (the broadcast delivery control unit 73) sets a state of such service area to COMPLETE (steps S407 and S428).

Then, the HNB-GW 12 registers the appropriate service area on the Number of Completed List and transmits a WRITE-REPLACE COMPLETE message to the CBC 11 (steps S410 and S431).

As described above, the response from the HNB 13 after the response from the HNB-GW 12 to the CBC 11 is not considered. It means the HNB-GW 12 ignores the received message when a broadcast delivery state of each service area is COMPLETE (steps S411 and S412 in FIG. 17 and step S432 in FIG. 18). However, the HNB-GW 12 waits for a response from another HNB 13 when the timer is running and the broadcast delivery state of the service area is not COMPLETE.

Figure 19:
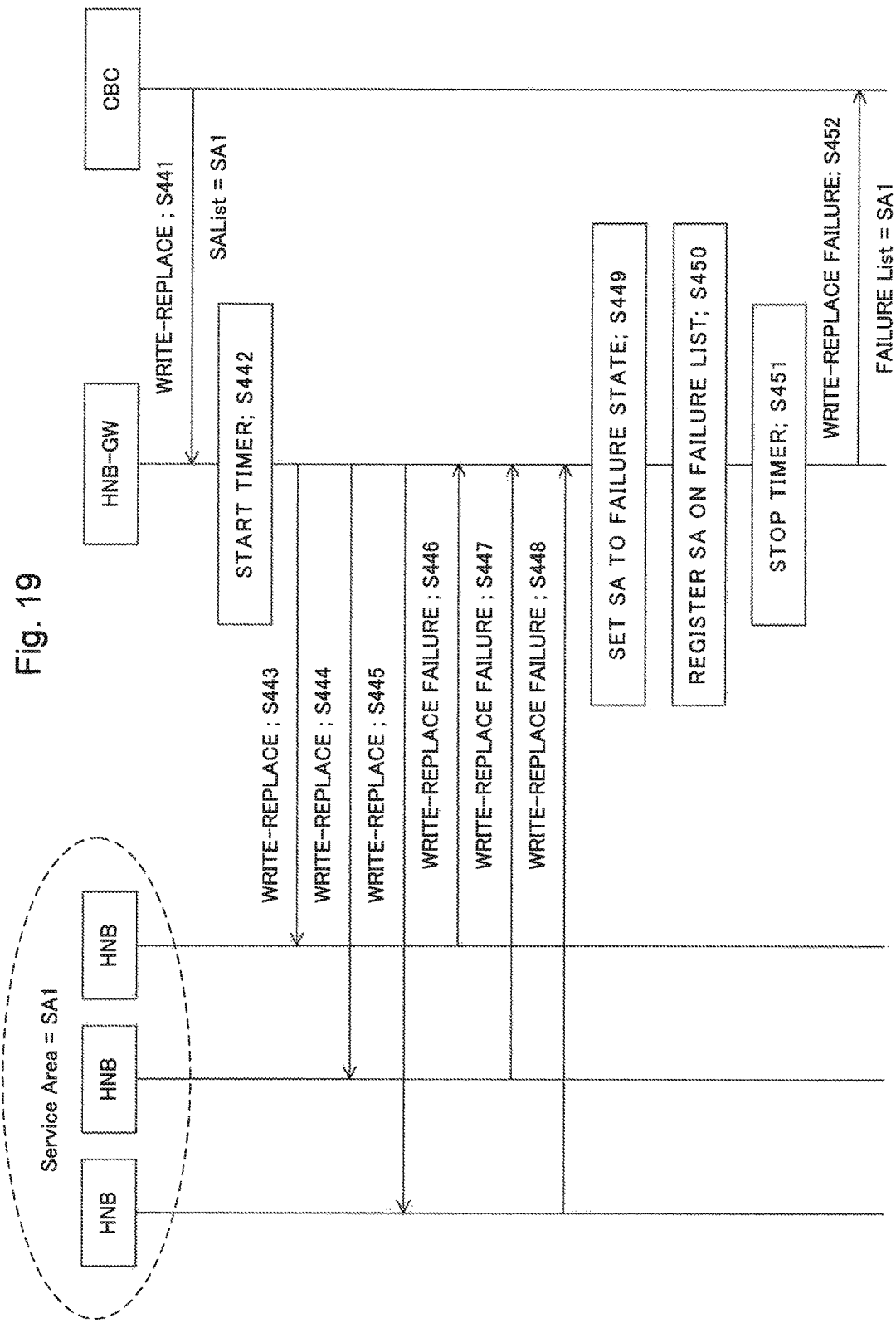
FIG. 19 is a sequence diagram for explaining operations of the broadcast delivery control unit.

Also, referring to FIG. 19, when WRITE-REPLACE FAILURE messages are received from all HNBs 13 included in the subordinate service area, the HNB-GW 12 sets the broadcast delivery state of such service area to FAILURE (step S449). Then, the HNB-GW 12 transmits the WRITE-REPLACE FAILURE message to the CBC 11 (step S452).

Figure 20:
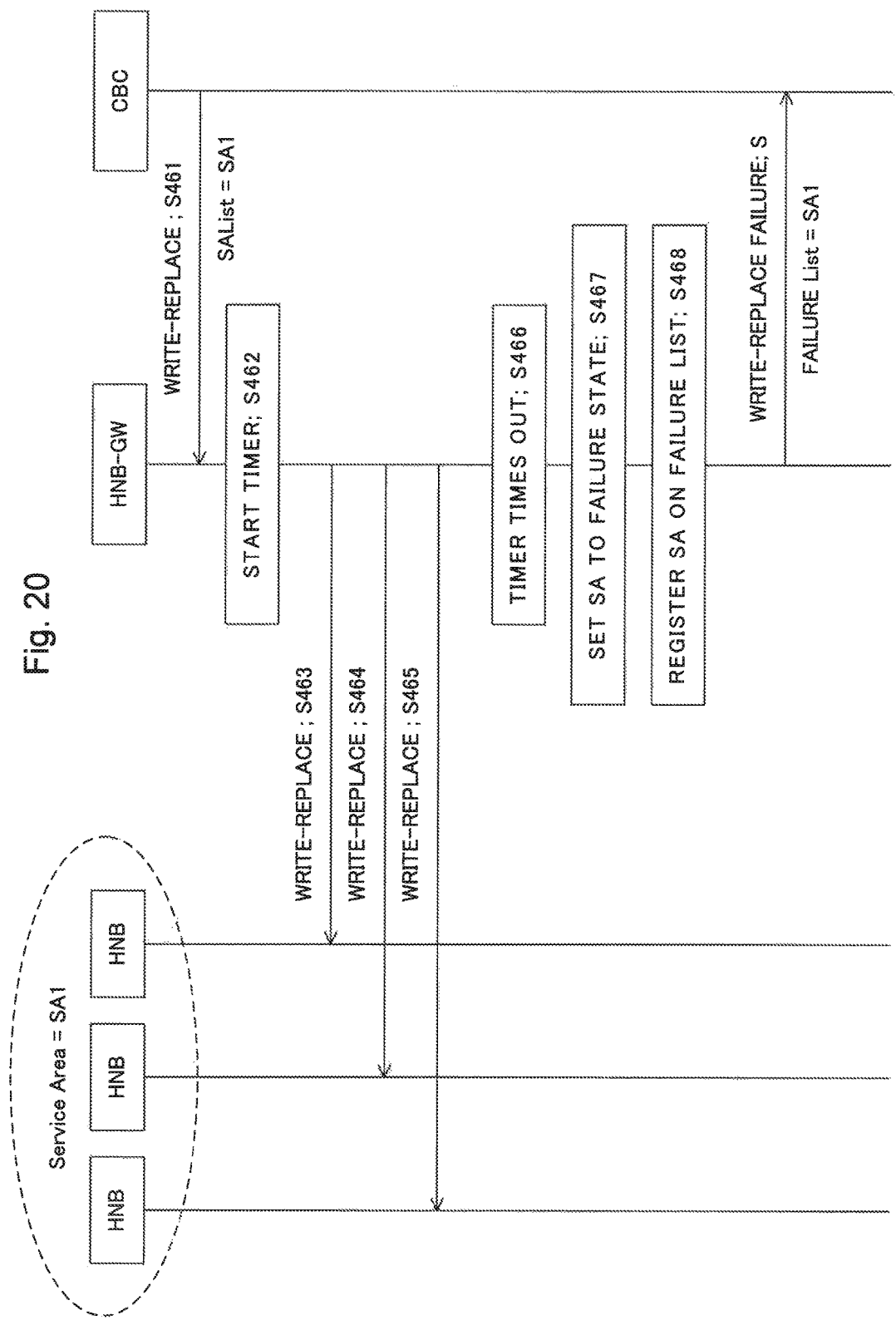
FIG. 20 is a sequence diagram for explaining operations of the broadcast delivery control unit.

Also, referring to FIG. 20, the HNB-GW 12 sets the state of such service area to FAILURE even if there is no response from the HNBs 13 included in the subordinate service area during running of the timer (step S467).

Further, if a return of a COMPLETE message is received from an HNB 13 when the timer has already stopped (expired), the HNB-GW 12 ignores such received COMPLETE message. Alternatively, when the HNB-GW 12 transfers a message to an HNB 13, the state of the appropriate service area is set to FAILURE to notify the CBC 11 if there is no HNB 13 that can receive the transferred message under the service area.

[Operations of Service Area Management Unit]

Next, operations of the service area management unit 74 in a case of receiving each signal of the foregoing Class 2 are explained with reference to FIGS. 21 to 23.

Figure 21:
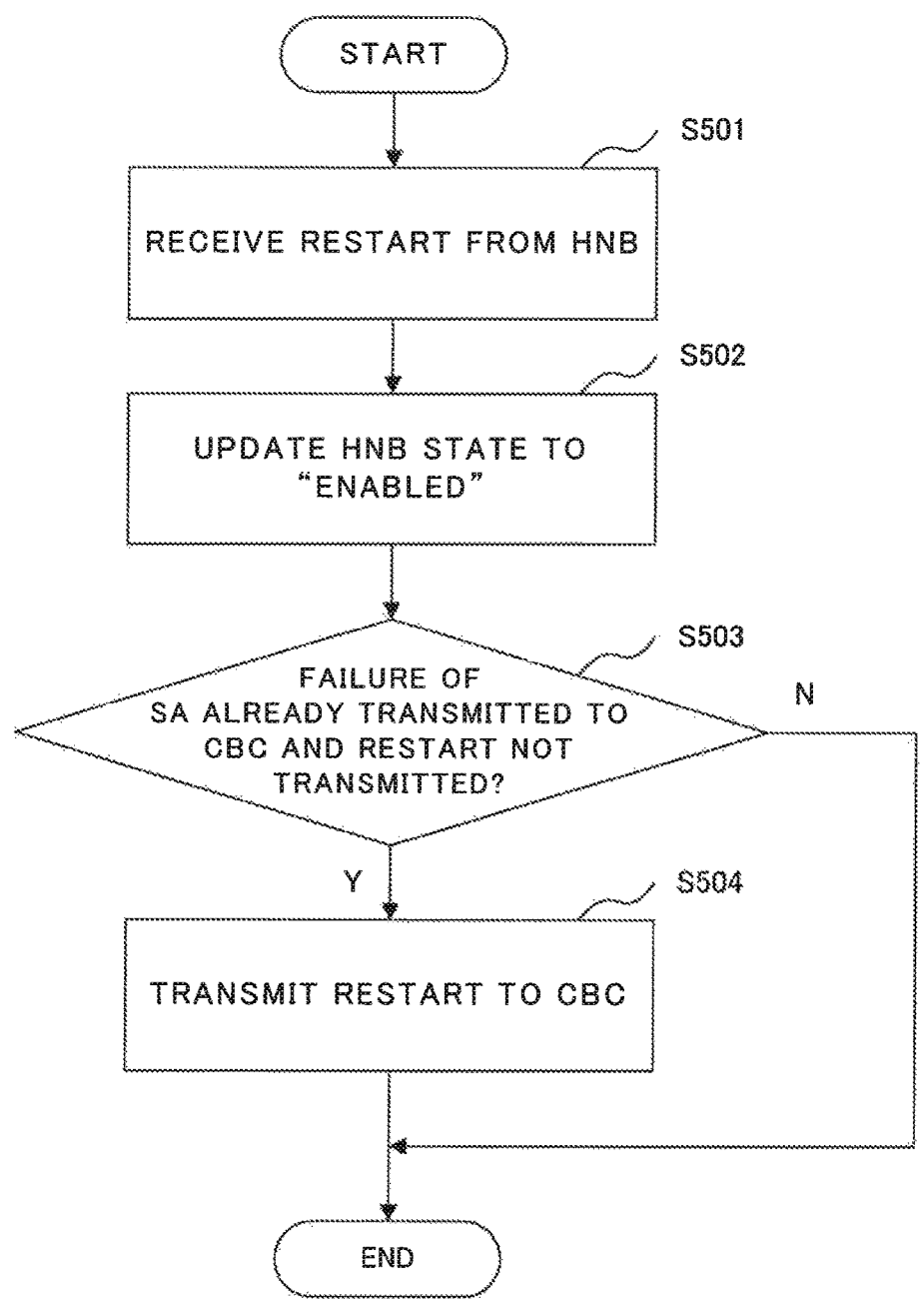
FIG. 21 is a flowchart for explaining operations of a service area management unit.

Referring to FIG. 21, the service area management unit 74 receives a RESTART message specified by the SABP from an HNB 13 (step S501). The service area management unit 74 sets a state of the HNB 13 corresponding to a received LAC to "operating (enabled)" to reflect it on the HNB management table (step S502).

When the broadcast delivery state of the service area has been set to FAILURE and already transmitted to the CBC 11 and the RESTART message has not been transmitted (the Yes branch on step S503), the service area management unit 74 transmits the RESTART message to the CBC 11 (step S504).

It is noted that the service area management unit 74 adds the appropriate SA to the SA List based on the RESTART message of the SABP and transfers the RESTART message to the CBC 11 if a message received from the registered service area is the first message from an HNB 13. Also, when the appropriate SA has already been set on the SA List and the RESTART message has been transmitted to the CBC 11, the HNB-GW 12 discards the RESTART message.

Figure 22:
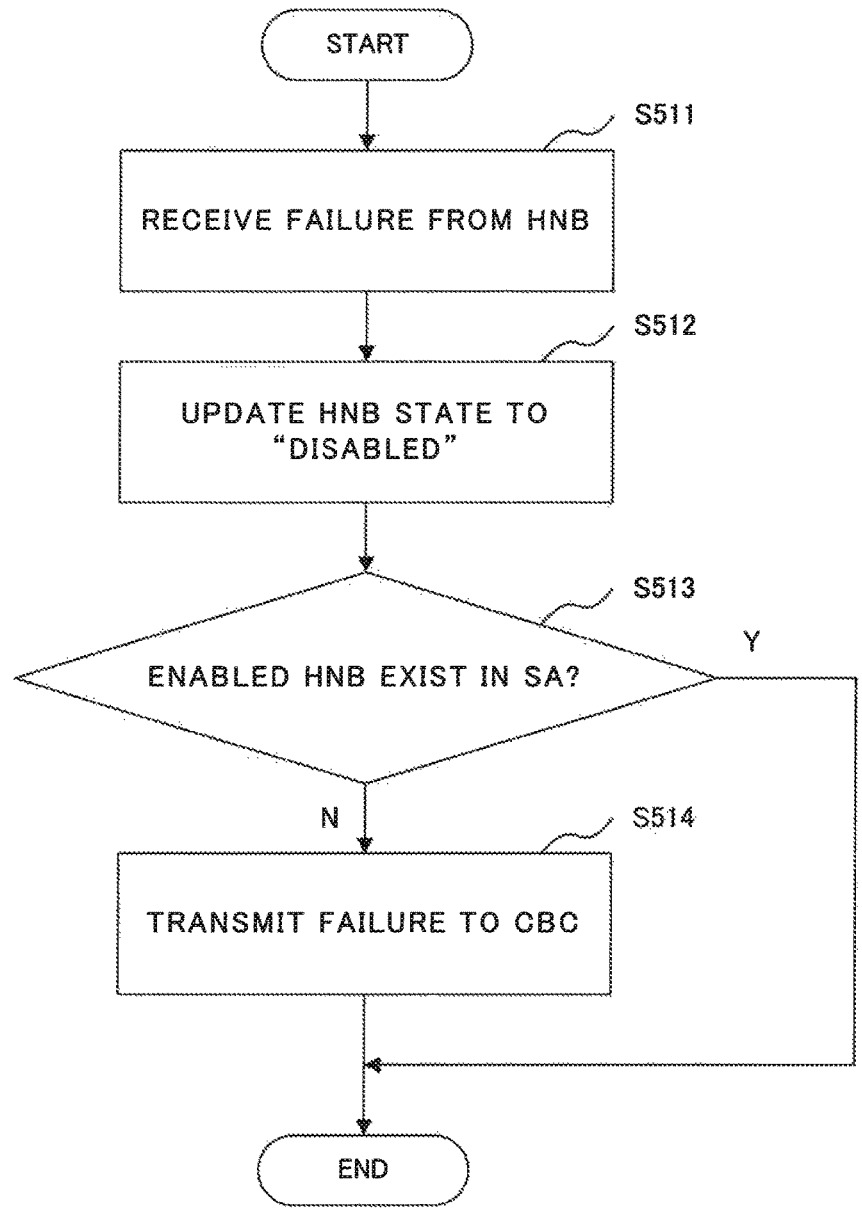
FIG. 22 is a flowchart for explaining operations of the service area management unit.

Referring to FIG. 22, the service area management unit 74 receives a FAILURE message from the HNB 13 (step S511). In this case, the service area management unit 74 sets a state of the HNB 13 corresponding to a received LAC to "stopped (disabled)" to reflect it on the HNB management table (step S512). As a result, when there have been no enabled HNB 13 in the same service area (the No branch on step S513), the service area management unit 74 transmits the FAILURE message to the CBC 11 (step S514).

Figure 23:
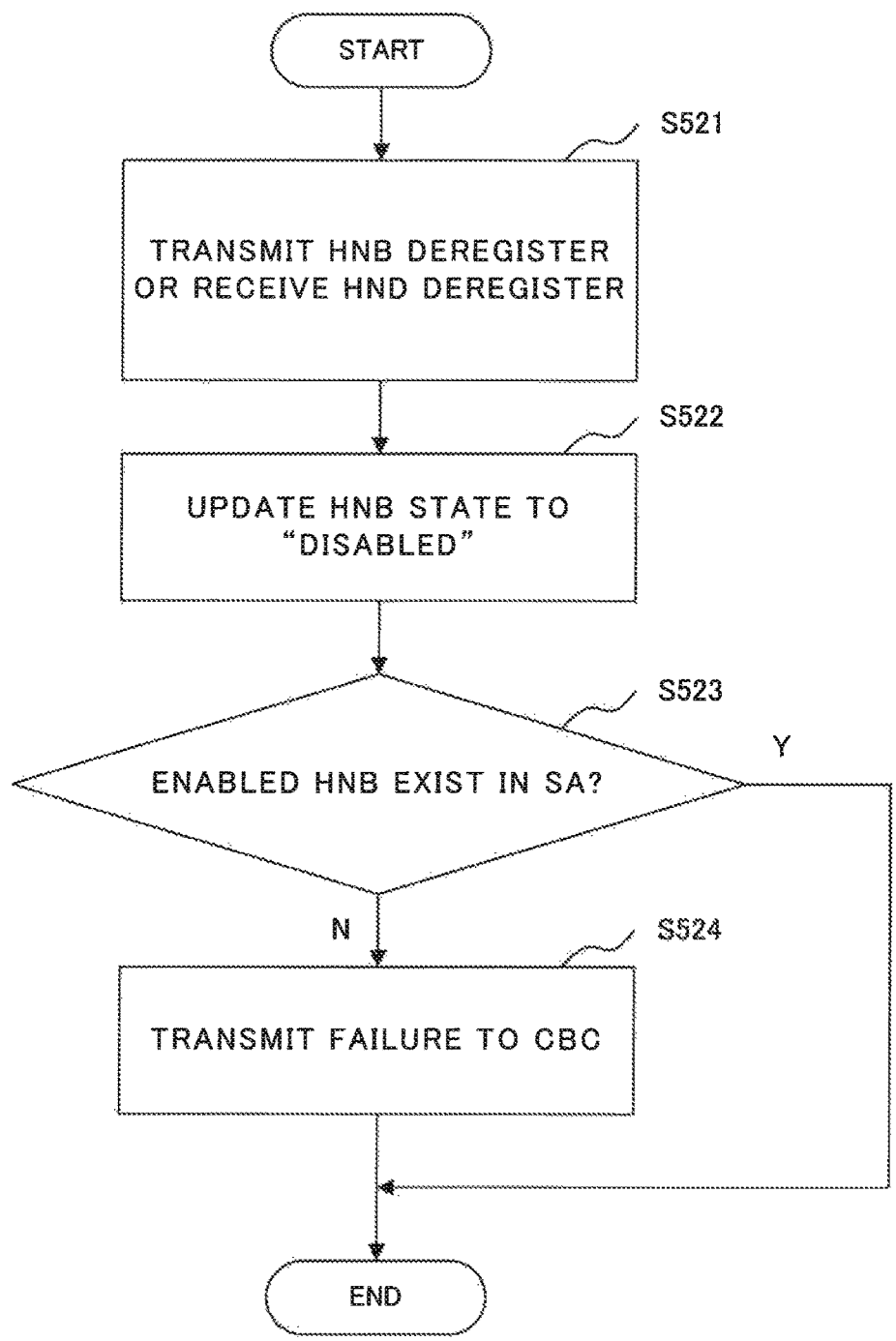
FIG. 23 is a flowchart for explaining operations of the service area management unit.

The service area management unit 74 transmits the FAILURE message to the CBC 11 when the HNB 13 has not been able to be used in the case other than the above (refer to FIG. 23).

Referring to FIG. 23, when an HNB DEREGISTER message is transmitted (when connection between the HNB-GW and an HNB has been disconnected) or when the HNB DEREGISTER message is received from an HNB (step S521), a state of such HNB 13 is set to "stopped (disabled)" (step S522). Also, as a result, when there have been no enabled HNB 13 in the same service area (the No branch on step S523), the service area management unit 74 transmits a FAILURE message to the CBC 11 (step S524).

As described above, in the broadcast delivery system relating to the first example embodiment, a relay device (the HNB-GW 12) located between the CBC 11 and the HNB 13 associates and manages a service area and an HNB 13 belonging to such service area. The HNB-GW 12 also controls and manages an operating state of an HNB and broadcast delivery. In other words, the CBC 11 does not have to perform complicated control or management (state management for all HNBs or the like) of which the HNB-GW 12 takes charge, and it is sufficient that the CBC 11 manages a state per service area. As a result, loads to deliver an urgent news message to HNBs 13 from the CBC 11 are reduced.

More specifically, as explained using FIG. 3, a LAC and a Service Area for Broadcast are associated and saved using an HNB REGISTER REQUEST message when a new HNB 13 is added in the HNB registration phase. It means the HNB-GW 12 is managed so that the HNB 13 identified by the LAC belongs to any Service Area for Broadcast. Further, if the HNB REGISTER REQUEST message is the first REGISTER REQUEST message obtained from such service area, the HNB-GW 12 notifies the CBC 11 of a delivery destination of an urgent news message by setting the Service Area for Broadcast IE to a Service Area IE in a RESTART message specified by the SABP.

As a result of the above response in the HNB-GW 12, the broadcast delivery system relating to the first example embodiment can register a plurality of HNBs 13 in one service area.

In addition, when an urgent news message is received from the CBC 11, the broadcast delivery system relating to the first example embodiment can deliver a message to a plurality of HNBs 13 by referencing a SA List, a service area, and HNB mapping information included in such message.

Further, the broadcast delivery system relating to the first example embodiment can manage a response message from an HNB 13 per service area and return the response message to the CBC 11 (handle a signal in Class 1 described above) after transferring an urgent news message coming from the CBC 11 from the HNB-GW 12 to the HNB 13.

Still further, the broadcast delivery system relating to the first example embodiment can manage an HNB per service area and transmit a message to the CBC 11 (handle a signal in Class 2 described above) after receiving a message from the HNB.

It is noted that the broadcast delivery control unit 73 and the service area management unit 74 can be realized by a computer program, in a computer mounted on the HNB-GW 12, executing the foregoing processes by the computer's hardware.

According to the above, CBC 11 can deliver the urgent news message to a UE 14 by management per service area without managing states of HNBs 13 whose number could reach hundreds of thousands. It means the CBC 11 may manage only a service area state because the HNB-GW 12 manages states of HNBs 13 instead of the CBC 11, which causes loads on the CBC 11 to decrease.

Also, for delivering an urgent news message, the CBC 11 does not require creating or delivering a list including all the HNBs 13 whose number could reach hundreds of thousands. It means the CBC 11 may deliver only messages whose number is equivalent to the number of service areas. Further, the items described above causes decrease in the number of signals between the HNB-GW 12 and the CBC 11. Specifically, because up to 65535 cells can be registered in one service area in terms of the specifications, the signals can be decreased to a minimum of $\frac{1}{65535}$.

It is noted that the configurations and operations of the broadcast delivery system explained in the first example embodiment are exemplary and various modifications can be possible. For example, in the approach of associating an HNB 13 with the service area list (SA List) that the HNB-GW obtains from the CBC 11, a Cell ID (Identifier) or a RAC (Routing Area Code) may be used instead of using a LAC.

The whole or part of the example embodiments disclosed above can be described as, but not limited to, the following supplementary notes.

[Supplementary Note 1]

A broadcast delivery system, comprising:

a femto cell base station for providing wireless connection for a terminal and forming one cell;

a gateway device for relaying data that the femto cell base station transmits and receives with a core network;

a wireless network control device connected to the gateway device; and a broadcast delivery device for transmitting, to the wireless network control device, a broadcast delivery message addressed to the terminal connected to the femto cell base station, wherein the gateway device controls an operating state of the femto cell base station and broadcast delivery to the terminal using a service area comprising at least one or more cells formed by the femto cell base station as a unit.

[Supplementary Note 2]

The broadcast delivery system of supplementary note 1, wherein the gateway device associates a new femto cell base station with a service area to which the new femto cell base station belongs to register on a first management table when the new femto cell base station transitions to an enabled state.

[Supplementary Note 3]

The broadcast delivery system of supplementary note 2, wherein the gateway device, in a case of receiving a location information registration request message from the new femto cell base station, notifies the wireless network control device that the service area to which the new femto cell base station belongs has become enabled when the location information registration request message has not been received from another femto cell base station in the service area to which the new femto cell base station belongs.

[Supplementary Note 4]

The broadcast delivery system of supplementary note 2 or 3, wherein the gateway device, in a case that a service area has no enabled existence of the femto cell base station, notifies the wireless network control device that the service area without existence of the enabled femto cell base station has become disabled.

[Supplementary Note 5]

The broadcast delivery system of any one of supplementary notes 2 to 4, wherein the gateway device identifies a service area delivering the broadcast delivery message and the femto cell base station that belongs to the service area delivering the broadcast delivery message by referencing the first management table when the broadcast delivery message is received from the broadcast delivery device through the wireless network control device.

[Supplementary Note 6]

The broadcast delivery system of supplementary note 5, wherein the gateway device manages a broadcast delivery state in each service area by a second management table and the second management table stores success or failure of broadcast delivery per service area.

[Supplementary Note 7]

The broadcast delivery system of supplementary note 6, wherein the gateway device starts a timer when the broadcast delivery message is received from the broadcast delivery device through the wireless network control device, and sets a broadcast delivery state in the service area transmitting the broadcast delivery message to failure to register on the second management table as well as notifies the wireless network control device that the broadcast delivery state in the service area transmitting the broadcast delivery message is failure when a message that broadcast delivery is successful is not received from the femto cell base station that belongs to the service area transmitting the broadcast delivery message within a period until expiration of the started timer.

[Supplementary Note 8]

A gateway device:

relaying data that a femto cell base station for providing wireless connection for a terminal and forming one cell transmits and receives with a core network; and controlling an operating state of the femto cell base station and broadcast delivery to the terminal using a service area comprising at least one or more cells formed by the femto cell base station as a unit.

[Supplementary Note 9]

A broadcast delivery method in a broadcast delivery system, comprising:

a femto cell base station for providing wireless connection for a terminal and forming one cell;

a gateway device for relaying data that the femto cell base station transmits and receives with a core network;

a wireless network control device connected to the gateway device; and a broadcast delivery device for transmitting, to the wireless network control device, a broadcast delivery message addressed to the terminal connected to the femto cell base station, the method, comprising the steps of:

managing an operating state of the femto cell base station using a service area comprising at least one or more cells formed by the femto cell base station as a unit; and controlling broadcast delivery to the terminal using a service area comprising at least one or more cells formed by the femto cell base station as a unit.

[Supplementary Note 10]

A program executed by a computer mounted on a gateway device for relaying data that a femto cell base station for providing wireless connection for a terminal and forming one cell transmits and receives with a core network, the program executing:

a process of managing an operating state of the femto cell base station using a service area comprising at least one or more cells formed by the femto cell base station as a unit; and a process of controlling broadcast delivery to the terminal using a service area comprising at least one or more cells formed by the femto cell base station as a unit.

It is noted that forms of supplementary notes 8 to 10 can develop into forms of supplementary notes 2 to 7 similarly to a form of supplementary note 1.

It is noted that each disclosure, such as the patent literatures or the like cited above, is incorporated by reference herein. An example embodiment or an example can be changed or adjusted within the range of this disclosure (including claims) and further based on its basic technological thought. Also, diverse combinations or selections of various disclosed elements (including each element in each claim, each element in each example embodiment or example, each element in each diagram, or the like) are possible within the range of this disclosure. It means the present invention includes each kind of variations and modifications that those skilled in the art could accomplish according to all the disclosure including claims and the technological thought as a matter of course. It should be interpreted in particular that, for the range of numbers described herein, an arbitrary number or a small range included in such range is specifically described if not otherwise described.

REFERENCE SIGNS LIST

10 CBE (Cell Broadcast Entity)
11 CBC (Cell Broadcast Center)
12 HNB-GW (Home Node B-Gateway)
13, 13-1 to 13-3 HNB (Home Node B)
14 UE (User Equipment)
51, 61, 71 Communication control unit
52, 72 Storage unit
53, 63 Broadcast delivery unit
62 State management unit
73 Broadcast delivery control unit
74 Service area management unit
100 Femto cell base station
101 Gateway device
102 Wireless network control device
103 Broadcast delivery device
201 to 203 Cell
211, 212 Service area

The invention claimed is:

1. A broadcast delivery system, comprising:
a home base station configured to communicate wirelessly with a terminal by using one cell;
a gateway device configured to relay data that the home base station transmits and receives with a core network;
a wireless network control device connected to the gateway device; and
a broadcast delivery device configured to transmit, to the wireless network control device, a broadcast delivery message addressed to the terminal connected to the home base station,
wherein the gateway device manages an operating state of the home base station and controls broadcast delivery to the terminal, using a service area comprising at least one or more cells formed by the home base station as a unit,
wherein the gateway device associates a new home base station with a service area to which the new home base station belongs to register on a first management table when the new home base station transitions to an enabled state, and
wherein the gateway device, in a case of receiving a location information registration request message from the new home base station, notifies the wireless network control device that the service area to which the new home base station belongs has become enabled when the location information registration request message has not been received from another home base station in the service area to which the new home base station belongs.

2. The broadcast delivery system of claim 1,
wherein the gateway device, in a case that a service area has no enabled existence of the home base station, notifies the wireless network control device that the service area without existence of the enabled home base station has become disabled.

3. The broadcast delivery system of claim 1,
wherein the gateway device identifies a service area delivering the broadcast delivery message and the home base station that belongs to the service area delivering the broadcast delivery message by referencing the first management table when the broadcast delivery message is received from the broadcast delivery device through the wireless network control device.

4. The broadcast delivery system of claim 3,
wherein the gateway device manages a broadcast delivery state in each service area by a second management table and the second management table stores success or failure of broadcast delivery per service area.

5. The broadcast delivery system of claim 4,
wherein the gateway device starts a timer when the broadcast delivery message is received from the broadcast delivery device through the wireless network control device, and sets a broadcast delivery state in the service area transmitting the broadcast delivery message to failure to register on the second management table as well as notifies the wireless network control device that the broadcast delivery state in the service area transmitting the broadcast delivery message is failure when a message that broadcast delivery is successful is not received from the home base station that belongs to the service area transmitting the broadcast delivery message within a period until expiration of the started timer.

6. A gateway device comprising:
a communication control unit configured to relay data that a home base station for providing wireless connection for a terminal and forming one cell transmits and receives with a core network;
a service area management unit configured to manage an operating state of the home base station using a service area comprising at least one or more cells formed by the home base station as a unit; and
a broadcast delivery control unit configured to control broadcast delivery of a broadcast delivery message, received from a broadcast delivery device through a wireless network control device, to the terminal, using a service area comprising at least one or more cells formed by the home base station as a unit,
wherein the service area management unit associates a new home base station with a service area to which the new home base station belongs to register on a first management table when the new home base station transitions to an enabled state, and wherein the broadcast delivery control unit, in a case of receiving a location information registration request message from the new home base station, notifies a wireless network control device that the service area to which the new home base station belongs has become enabled when the location information registration request message has not been received from another home base station in the service area to which the new home base station belongs.

7. The gateway device of claim 6,
wherein the service area management unit, in a case that a service area has no enabled existence of the home base station, notifies the wireless network control device that the service area without existence of the enabled home base station has become disabled.

8. A broadcast delivery method in a broadcast delivery system comprising:
   a home base station that provides wireless connection for a terminal and forms one cell;
   a gateway device for relaying data that the home base station transmits and receives with a core network;
   a wireless network control device connected to the gateway device; and
   a broadcast delivery device for transmitting, to the wireless network control device, a broadcast delivery message addressed to the terminal connected to the home base station,
   the method comprising:
      managing, by the gateway device, an operating state of the home base station using a service area comprising at least one or more cells formed by the home base station as a unit;
      controlling, by the gateway device, broadcast delivery to the terminal using a service area comprising at least one or more cells formed by the home base station as a unit;
      associating, by the gateway device, a new home base station with a service area to which the new home base station belongs to register on a first management table when the new home base station transitions to an enabled state; and
      in a case of receiving a location information registration request message from the new home base station, notifying, by the gateway device, the wireless network control device that the service area to which the new home base station belongs has become enabled when the location information registration request message has not been received from another home base station in the service area to which the new home base station belongs.

9. The broadcast delivery method of claim 8, further comprising:
   in a case that a service area has no enabled existence of the home base station, notifying, by the gateway device, the wireless network control device that the service area without existence of the enabled home base station has become disabled.

10. The broadcast delivery method of claim 9, further comprising:
   managing, by the gateway device, a broadcast delivery state in each service area by a second management table and the second management table stores success or failure of broadcast delivery per service area.

11. The broadcast delivery method of claim 10, further comprising:
   starting, by the gateway device, a timer when the broadcast delivery message is received from the broadcast delivery device through the wireless network control device, and setting a broadcast delivery state in the service area transmitting the broadcast delivery message to failure to register on the second management table as well as notifying the wireless network control device that the broadcast delivery state in the service area transmitting the broadcast delivery message is failure when a message that broadcast delivery is successful is not received from the home base station that belongs to the service area transmitting the broadcast delivery message within a period until expiration of the started timer.

\* \* \* \* \*